US012567379B2

(12) United States Patent
Kim et al.

(10) Patent No.: US 12,567,379 B2
(45) Date of Patent: Mar. 3, 2026

(54) DISPLAY DEVICE INCLUDING DATA DRIVING CIRCUIT HAVING COMPARISON CIRCUIT FOR OUTPUTTING BIAS CURRENT CONTROL SIGNAL

(71) Applicant: Samsung Display Co., Ltd., Yongin-Si (KR)

(72) Inventors: Yoosung Kim, Yongin-si (KR); Hyunho Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/770,664

(22) Filed: Jul. 12, 2024

(65) Prior Publication Data

US 2025/0149000 A1 May 8, 2025

(30) Foreign Application Priority Data

Nov. 8, 2023 (KR) ........................ 10-2023-0153260

(51) Int. Cl.
*G09G 3/3275* (2016.01)

(52) U.S. Cl.
CPC ..... *G09G 3/3275* (2013.01); *G09G 2310/027* (2013.01); *G09G 2310/0291* (2013.01); *G09G 2330/021* (2013.01)

(58) Field of Classification Search
CPC .................................................... G09G 3/3275
USPC .......................................................... 345/212
See application file for complete search history.

(56) References Cited

U.S. PATENT DOCUMENTS

| | | | | |
|---|---|---|---|---|
| 7,800,573 B2 | 9/2010 | Woo et al. | | |
| 2009/0002358 A1* | 1/2009 | Tamura | G09G 3/3688 345/212 | |
| 2011/0248982 A1* | 10/2011 | Chuang | G09G 3/3685 345/212 | |
| 2013/0307838 A1 | 11/2013 | Kim et al. | | |
| 2019/0051264 A1* | 2/2019 | Kim | G09G 3/3688 | |
| 2022/0189431 A1* | 6/2022 | Lim | G09G 3/3677 | |

FOREIGN PATENT DOCUMENTS

| | | |
|---|---|---|
| KR | 10-0688538 B1 | 3/2007 |
| KR | 10-1179546 B1 | 9/2012 |
| KR | 10-2013-0128933 A | 11/2013 |
| KR | 10-2536726 B1 | 5/2023 |

* cited by examiner

*Primary Examiner* — Long D Pham
(74) *Attorney, Agent, or Firm* — Innovation Counsel LLP

(57) ABSTRACT

Disclosed is a display device including a data driving circuit and a display panel. In the data driving circuit, the plurality of latches store pieces of latch data, respectively, and the plurality of comparison circuit are positioned to correspond to the plurality of latches. Each of the plurality of comparison circuit compares present latch data with previous latch data, and outputs a first bias current control signal depending on the comparison result. The plurality of level shifting circuits respectively output pieces of image data by shifting levels of the pieces of latch data. Each of the plurality of sub-level shifting circuits outputs a second bias current control signal by shifting a level of the first bias current control signal.

22 Claims, 12 Drawing Sheets

DISPLAY DEVICE INCLUDING DATA DRIVING CIRCUIT HAVING COMPARISON CIRCUIT FOR OUTPUTTING BIAS CURRENT CONTROL SIGNAL

CROSS-REFERENCE TO RELATED APPLICATIONS

This application claims priority under 35 U.S.C. § 119 to Korean Patent Application No. 10-2023-0153260 filed on Nov. 8, 2023, in the Korean Intellectual Property Office, the disclosures of which are incorporated by reference herein in their entireties.

BACKGROUND

Embodiments of the present disclosure described herein relate to a display device, and more particularly, relate to a display device capable of reducing power consumption.

A light emitting display device among display devices displays an image by using a light emitting diode that generates light through the recombination of electrons and holes. The light emitting display device is driven with a low power while providing a fast response speed.

A light emitting display device includes a display panel on which pixels connected to data lines and scan lines are disposed. Each of the pixels generally includes a light emitting diode, and a pixel circuit unit for controlling the amount of current flowing to the light emitting diode. The pixel circuit unit controls the amount of current flowing through the light emitting diode in response to a data signal. In this case, light of predetermined luminance is generated to correspond to the amount of current flowing through the light emitting diode.

SUMMARY

Embodiments of the present disclosure provide a display device having a data driving circuit capable of reducing power consumption.

According to an embodiment, a display device includes a data driving circuit which includes a plurality of channels respectively outputting a plurality of data signals, and a display panel that receives the data signals output from the data driving circuit.

The data driving circuit includes a plurality of latches, a plurality of comparison circuits, a plurality of level shifting circuits, a plurality of sub-level shifting circuits, a plurality of digital-to-analog conversion circuits, and a plurality of output buffers.

The plurality of latches store pieces of latch data, respectively. The plurality of comparison circuit are positioned to correspond to the plurality of latches. Each of the plurality of comparison circuit compares present latch data with pre-stored previous latch data, and outputs a first bias current control signal depending on the comparison result.

The plurality of level shifting circuits respectively receive the pieces of latch data from the plurality of latches, and respectively output pieces of image data by shifting levels of the pieces of latch data. Each of the plurality of sub-level shifting circuits receives the first bias current control signal from the plurality of comparison circuits, and outputs a second bias current control signal by shifting a level of the first bias current control signal.

The plurality of digital-to-analog conversion circuits respectively convert the pieces of image data into the data signals having an analog format. The plurality of output buffers respectively output the data signals to the plurality of channels. Here, the second bias current control signal reduces a bias current of a corresponding output buffer among the plurality of output buffers.

According to an embodiment, a display device includes a data driving circuit including a plurality of channels, which respectively output a plurality of data signals, and a display panel that receives the data signals output from the data driving circuit.

The data driving circuit includes a plurality of latches, a plurality of level shifting circuits, a plurality of comparison circuits, a plurality of digital-to-analog conversion circuits, and a plurality of output buffers.

The plurality of latches store latch data, respectively. The plurality of level shifting circuits respectively receive the pieces of latch data from the plurality of latches, and respectively output pieces of image data by shifting levels of the pieces of latch data.

The plurality of comparison circuits are respectively disposed to correspond to the plurality of level shifting circuits. Each of the plurality of comparison circuits compares present image data with pre-stored previous image data, and outputs a bias current control signal depending on the comparison result. The plurality of digital-to-analog conversion circuits respectively convert the pieces of image data into the data signals having an analog format. The plurality of output buffers respectively output the data signals to the plurality of channels. Here, the bias current control signal reduces a bias current of a corresponding output buffer among the plurality of output buffers.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
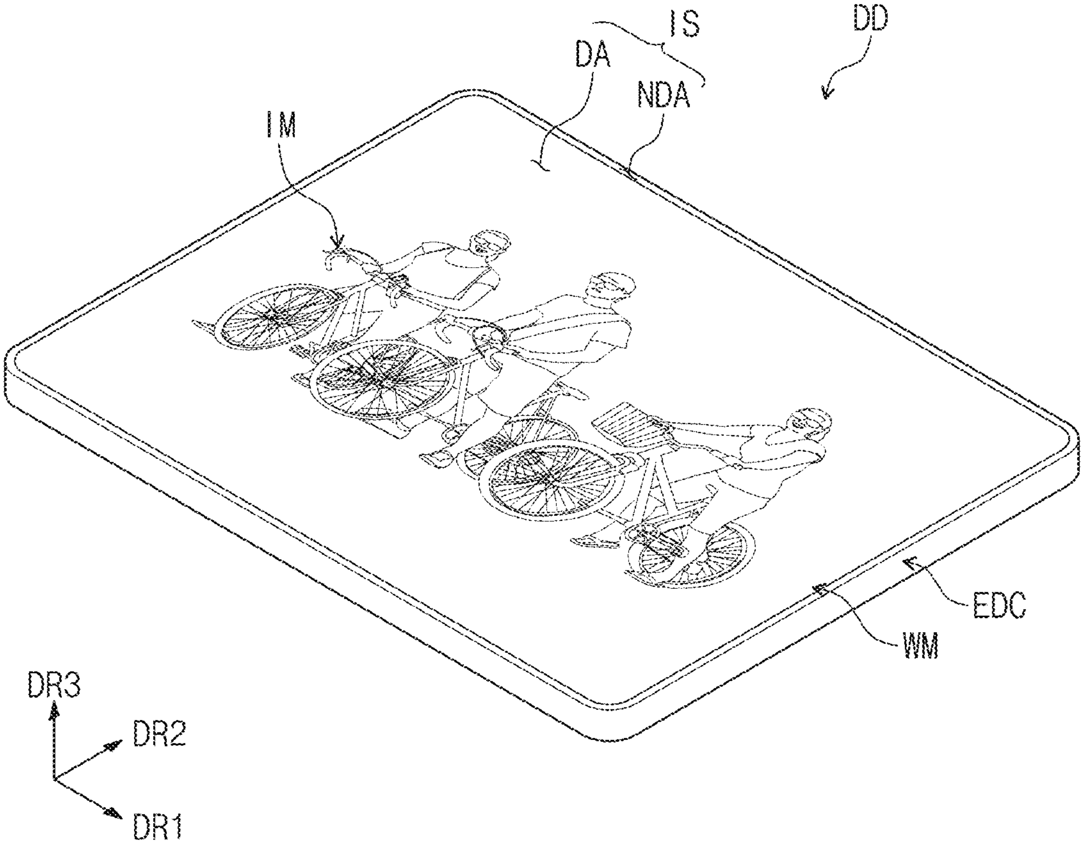
FIG. 1 is a perspective view of a display device according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
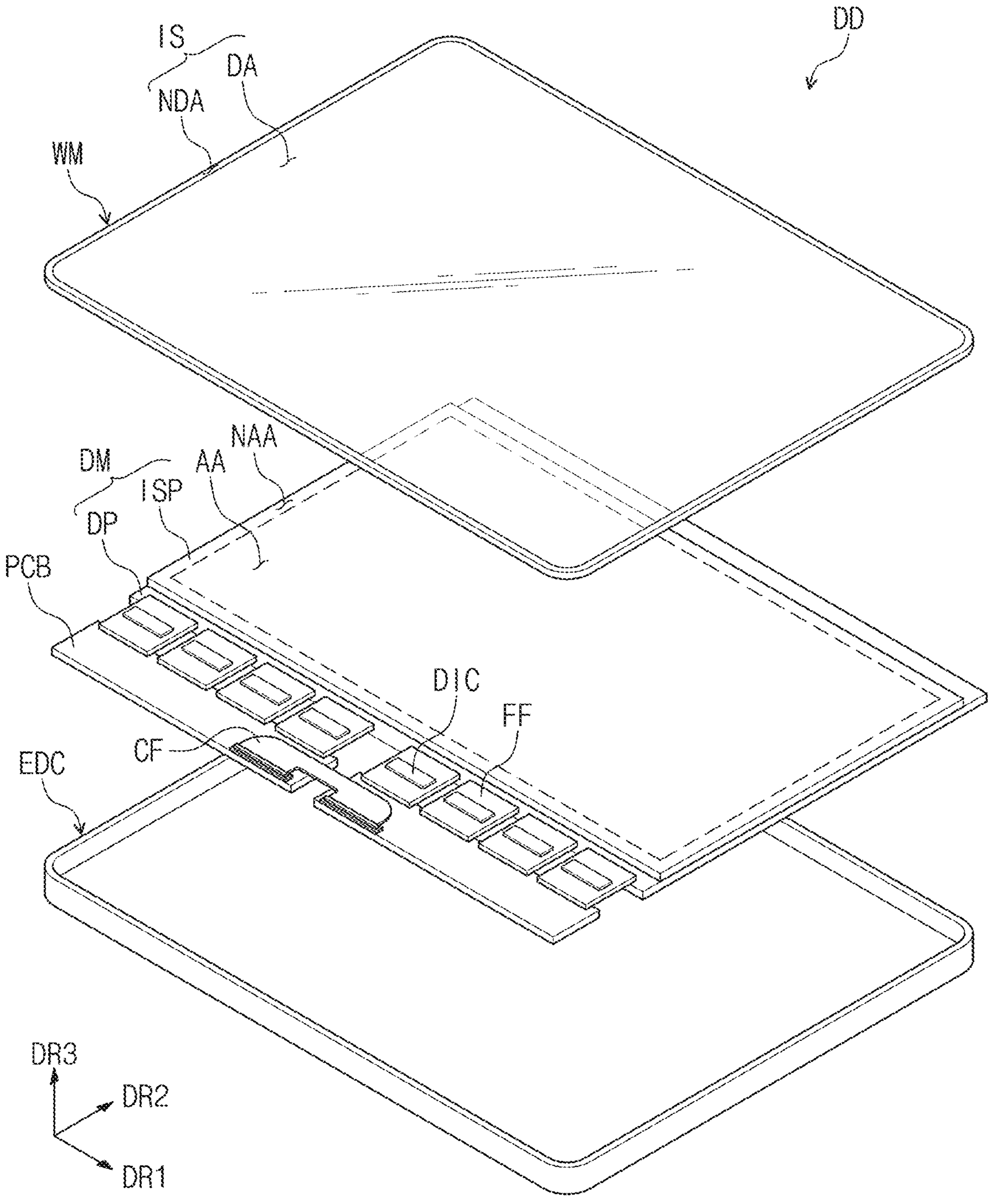
FIG. 2 is an exploded perspective view of a display device according to an embodiment of the present disclosure.

FIG. 1 is a perspective view of a display device according to an embodiment of the present disclosure. FIG. 2 is an exploded perspective view of a display device according to an embodiment of the present disclosure.

Referring to FIGS. 1 and 2, the display device DD may be a device activated depending on an electrical signal. The display device DD according to the present disclosure may be a small and medium-sized electronic device such as a mobile phone, a tablet PC, a notebook computer, a vehicle navigation system, or a game console, as well as a large-sized electronic device such as a television or a monitor. The above examples are provided only as an example, and it is obvious that the display device DD may be implemented as another type of a display device without departing from the concept of the present disclosure. The display device DD is in a shape of a rectangle having a long side in the first direction DR1 and a short side in the second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user which is applied from the outside. The external input of the user may be one of various types of external inputs such as a part of his/her body, light, heat, his/her gaze, and pressure, or a combination thereof. Also, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may include a display area DA and a non-display area NDA. The display area DA may be an area in which the image IM is displayed. A user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is disposed adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, an embodiment is not limited thereto. For example, the window WM may include a plurality of layers.

Meanwhile, although not illustrated, the non-display area NDA of the display device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed, for example, through a coating process.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer (not shown) may be further disposed between the window WM and the display module DM. The anti-reflection layer decreases the reflectivity of external light incident from above the window WM. The anti-reflection layer according to an embodiment of the present disclosure may include a phase retarder and a polarizer. The phase retarder may have a film type or a liquid crystal coating type and may include a $\lambda/2$ phase retarder and/or a $\lambda/4$ phase retarder. The polarizer may also have a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. In this case, the anti-reflection layer may further include a light blocking pattern disposed between the color filters.

The display module DM may display the image IM depending on an electrical signal and may transmit/receive information about an external input. The display module DM may include an active area AA and an inactive area NAA. The active area AA may be defined as an area through which the image IM is output from the display panel DP. Also, the active area AA may be an area in which the input sensing layer ISP senses an external input applied from the outside. According to an embodiment, the active area AA of the display module DM may correspond to (or overlap) at least part of the display area DA.

The inactive area NAA is disposed adjacent to the active area AA. The inactive area NAA may be an area in which the image IM is not substantially displayed. For example, the inactive area NAA may surround the active area AA. However, this is illustrated by way of example. The inactive area NAA may be defined in various shapes, not limited to an embodiment. According to an embodiment, the inactive area NAA of the display module DM may correspond to (or overlap) at least part of the non-display area NDA.

The display device DD may further include a plurality of flexible films FF connected to the display panel DP. A driver chip DIC may be mounted on each of the flexible films FF. As an example of the present disclosure, a data driving circuit 200 (see FIG. 3) may include the plurality of driver chips DIC, and the plurality of driver chips DIC may be respectively mounted on the plurality of flexible films FF.

The display device DD may further include at least one circuit board PCB coupled to the plurality of flexible films FF. As an example of the present disclosure, the two circuit boards PCB are provided in the display device DD, but the number of circuit boards PCB is not limited thereto. Two adjacent circuit boards among the circuit boards PCB may be electrically connected to each other by a connection film CF. Also, at least one of the circuit boards PCB may be electrically connected to a main board. A driving controller 100 (see FIG. 3) and a voltage generator 400 (see FIG. 3) may be disposed on at least one of the circuit boards PCB.

FIG. 2 illustrates a structure in which the driver chips DIC are respectively mounted on the flexible films FF, but the present disclosure is not limited thereto. For example, the driver chips DIC may be directly mounted on the display panel DP. In this case, a portion of the display panel DP, on which the driver chip DIC is mounted, may be bent such that the driver chip DIC is disposed on a rear surface of the display module DM.

The input sensing layer ISP may be electrically connected to the circuit board PCB through the flexible films FF. However, an embodiment of the present disclosure is not limited thereto. That is, the display module DM may additionally include a separate flexible film for electrically connecting the input sensing layer ISP and the circuit board PCB.

The display device DD further includes housing EDC for accommodating the display module DM. The housing EDC may be coupled with the window WM to define the exterior appearance of the display device DD. The housing EDC may absorb external shocks and may prevent a foreign material/moisture or the like from being infiltrated into the display module DM such that components accommodated in the housing EDC are protected. Meanwhile, as an example of the present disclosure, the housing EDC may be provided in the form of a combination of a plurality of accommodating members.

The display device DD according to an embodiment may further include an electronic module including various functional modules for operating the display module DM, a power supply module (e.g., a battery) for supplying a power necessary for overall operations of the display device DD, a bracket coupled with the display module DM and/or the housing EDC to partition an inner space of the display device DD, etc.

Figure 3:
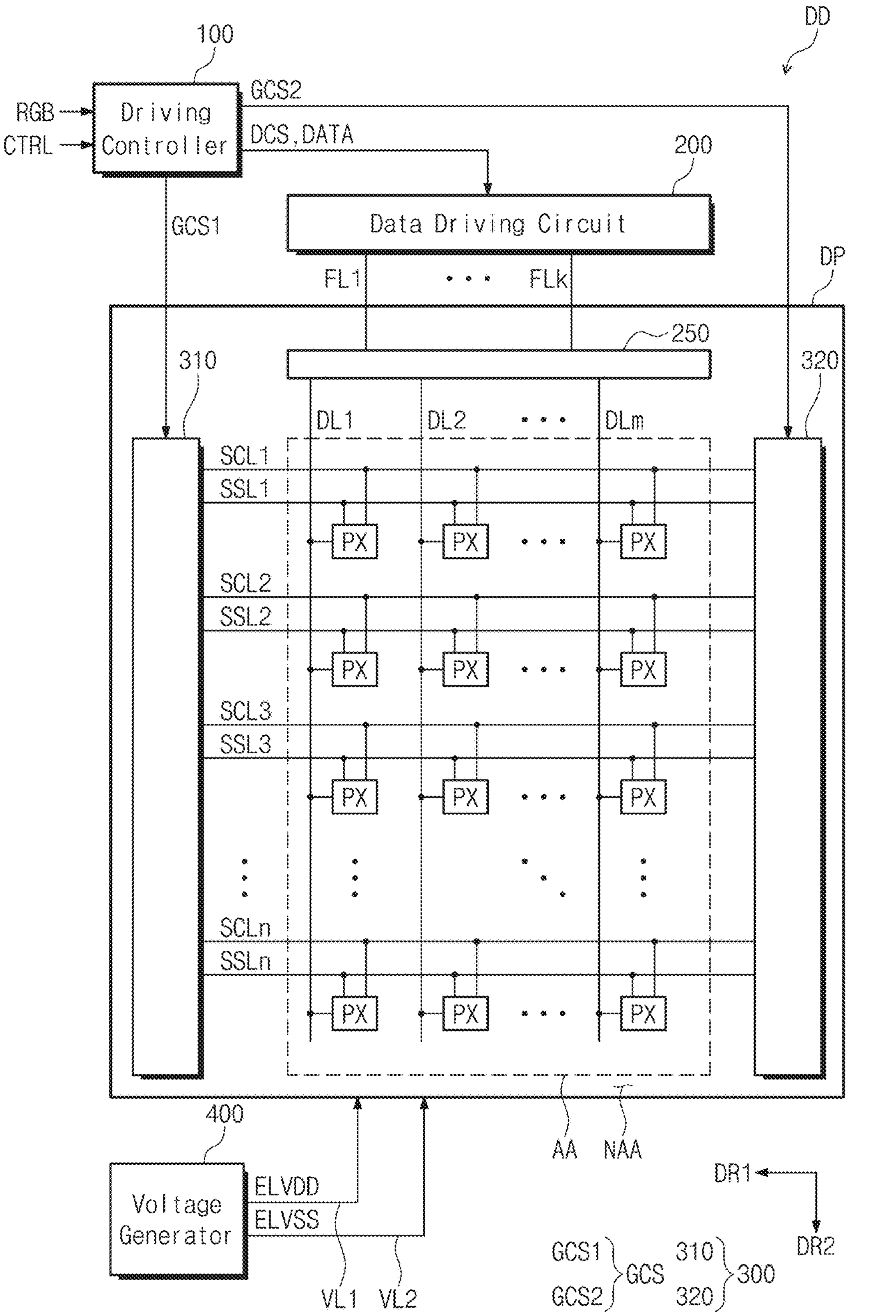
FIG. 3 is a block diagram of a display device according to an embodiment of the present disclosure.

FIG. 3 is a block diagram of a display device according to an embodiment of the present disclosure.

Referring to FIG. 3, the display device DD includes a driving controller 100, a data driving circuit 200, a selection circuit 250, a scan driving circuit 300, a voltage generator 400, and the display panel DP.

The display panel DP includes driving scan lines SCL1 to SCLn, sensing scan lines SSL1 to SSLn, data lines DL1 to DLm, and pixels PX. Here, 'n' and 'm' are integers greater than or equal to 1. The display panel DP may include the active area AA and the inactive area NAA. The pixels PX may be positioned in the active area AA. The scan driving circuit 300 may be positioned in the inactive area NAA.

The driving scan lines SCL1 to SCLn and the sensing scan lines SSL1 to SSLn extend in parallel with the first direction DR1 and are arranged spaced from each other in the second direction DR2. The second direction DR2 may be a direction intersecting the first direction DR1. The data lines DL1 to DLm extend to be parallel to the second direction DR2 and are arranged spaced from each other in the first direction DR1.

The plurality of pixels PX are electrically connected to the driving scan lines SCL1 to SCLn, the sensing scan lines SSL1 to SSLn, and the data lines DL1 to DLm. Each of the plurality of pixels PX may be electrically connected with two scan lines. However, the number of scan lines connected to each of the pixels PX is not limited thereto. For example, each pixel may be electrically connected to one or three scan lines. The display panel DP may extend in the second direction DR2 and may further include sensing lines arranged in the first direction DR1. In this case, the plurality of pixels PX may be connected to sensing lines.

Each of the plurality of pixels PX includes a light emitting element and a pixel circuit unit for controlling the emission of the light emitting element. The light emitting element may include an organic light emitting diode. The pixel circuit unit may include a plurality of transistors and at least one capacitor.

The driving controller 100 receives an input image signal RGB and a control signal CTRL from a main controller (e.g., a microcontroller or a graphics controller). The driving controller 100 may generate image data DATA by converting the input image signal RGB.

The driving controller 100 generates a scan control signal GCS and a data control signal DCS based on a control signal CTRL. The data driving circuit 200 receives the data control signal DCS and the image data DATA from the driving controller 100, and then converts the image data DATA into data signals in response to the data control signal DCS. The data driving circuit 200 outputs data signals to the plurality of data lines DL1 to DLm. The data signals may be analog voltages corresponding to grayscale values of the image data DATA.

Alternatively, the data driving circuit 200 may be further connected to a plurality of sensing lines. In this case, the data driving circuit 200 may further receive a sensing control signal from the driving controller 100, and may sense the characteristics of elements included in each of the pixels PX of the display panel DP in response to the sensing control signal.

As an example of the present disclosure, the data driving circuit 200 may be formed in a form of at least one chip. The data driving circuit 200 may be disposed in the driver chips DIC shown in FIG. 2.

The selection circuit 250 may be positioned between the data lines DL1 to DLm and the data driving circuit 200. The data driving circuit 200 may be electrically connected to the selection circuit 250 through fanout lines FL1 to FLk. Here, 'k' is an integer greater than or equal to 1 and less than 'm'. As an example of the present disclosure, the number (k) of the fanout lines FL1 to FLk may be ½, ⅓, or ¼ of the number (m) of the data lines DL1 to DLm. When the number (k) of the fanout lines FL1 to FLk is ½ of the number (m) of the data lines DL1 to DLm, the data lines DL1 to DLm may be classified into two groups (i.e., a first data line group and a second data line group). During a first selection period SP1 (see FIG. 6A), the selection circuit 250 electrically connects some (e.g., the first data line group) of the data lines DL1 to DLm to the data driving circuit 200. During a second selection period SP2 (see FIG. 6A), the selection circuit 250 electrically connects some (e.g., the second data line group) of the data lines DL1 to DLm to the data driving circuit 200.

As an example of the present disclosure, the selection circuit 250 may be placed in the inactive area NAA of the display panel DP. In particular, the selection circuit 250 may be formed in the inactive area NAA through the same process as the pixel circuit unit of each pixel PX. The number of channels CH1 to CHk (see FIG. 4) and the number of fanout lines FL1 to FLk of the data driving circuit 200 may be reduced overall by selectively driving the data lines DL1 to DLm by using the selection circuit 250.

The scan driving circuit 300 receives the scan control signal GCS from the driving controller 100. The scan driving circuit 300 may output scan signals in response to the scan control signal GCS. The scan driving circuit 300 may be formed in the display panel DP. When the scan driving circuit 300 is formed in the display panel DP, the scan driving circuit 300 may include transistors formed through the same process as the pixel circuit unit of each pixel PX. The scan driving circuit 300 may be placed in the inactive area NAA of the display panel DP, but the present disclosure is not limited thereto. Alternatively, the scan driving circuit 300 may be formed in the active area AA of the display panel DP.

The scan driving circuit 300 may generate a plurality of driving scan signals and a plurality of sensing scan signals in response to the scan control signal GCS. The plurality of driving scan signals are applied to the driving scan lines SCL1 to SCLn. The plurality of sensing scan signals are applied to the sensing scan lines SSL1 to SSLn.

As an example of the present disclosure, the scan driving circuit 300 includes a first scan driving circuit 310 and a second scan driving circuit 320. The first scan driving circuit 310 is placed on the left side of the active area AA. The second scan driving circuit 320 is placed on the right side of the active area AA. The first scan driving circuit 310 receives a first scan control signal GCS1 from the driver controller 100, and the second scan driving circuit 320 receives a second scan control signal GCS2 from the driver controller 100. The first scan driving circuit 310 may generate a plurality of driving scan signals and a plurality of sensing scan signals in response to the first scan control signal GCS1. The second scan driving circuit 320 may generate a plurality of driving scan signals and a plurality of sensing scan signals in response to the second scan control signal GCS2.

FIG. 3 shows a structure in which the first and second scan driving circuits 310 and 320 are respectively positioned on the left and right sides of the active area AA, but the present disclosure is not limited thereto. The scan driving circuit 300 may include only one of the first and second scan driving circuits 310 and 320.

Each of the plurality of pixels PX may receive a first driving voltage ELVSS and a second driving voltage ELVDD.

The voltage generator 400 generates voltages necessary to operate the display panel DP. In an embodiment of the present disclosure, the voltage generator 400 generates the first driving voltage ELVSS and the second driving voltage ELVDD which are necessary for the operation of the display panel DP. The first driving voltage ELVSS and the second driving voltage ELVDD may be provided to the display panel DP through a first driving voltage line VL1 and a second driving voltage line VL2, respectively.

As well as the first driving voltage ELVSS and the second driving voltage ELVDD, the voltage generator 400 may further generate various voltages (e.g., a gamma reference voltage, a data driving voltage, a gate-on voltage, and a gate-off voltage) necessary for operations of the source driving circuit 200 and the scan driving circuit 300.

Figure 4:
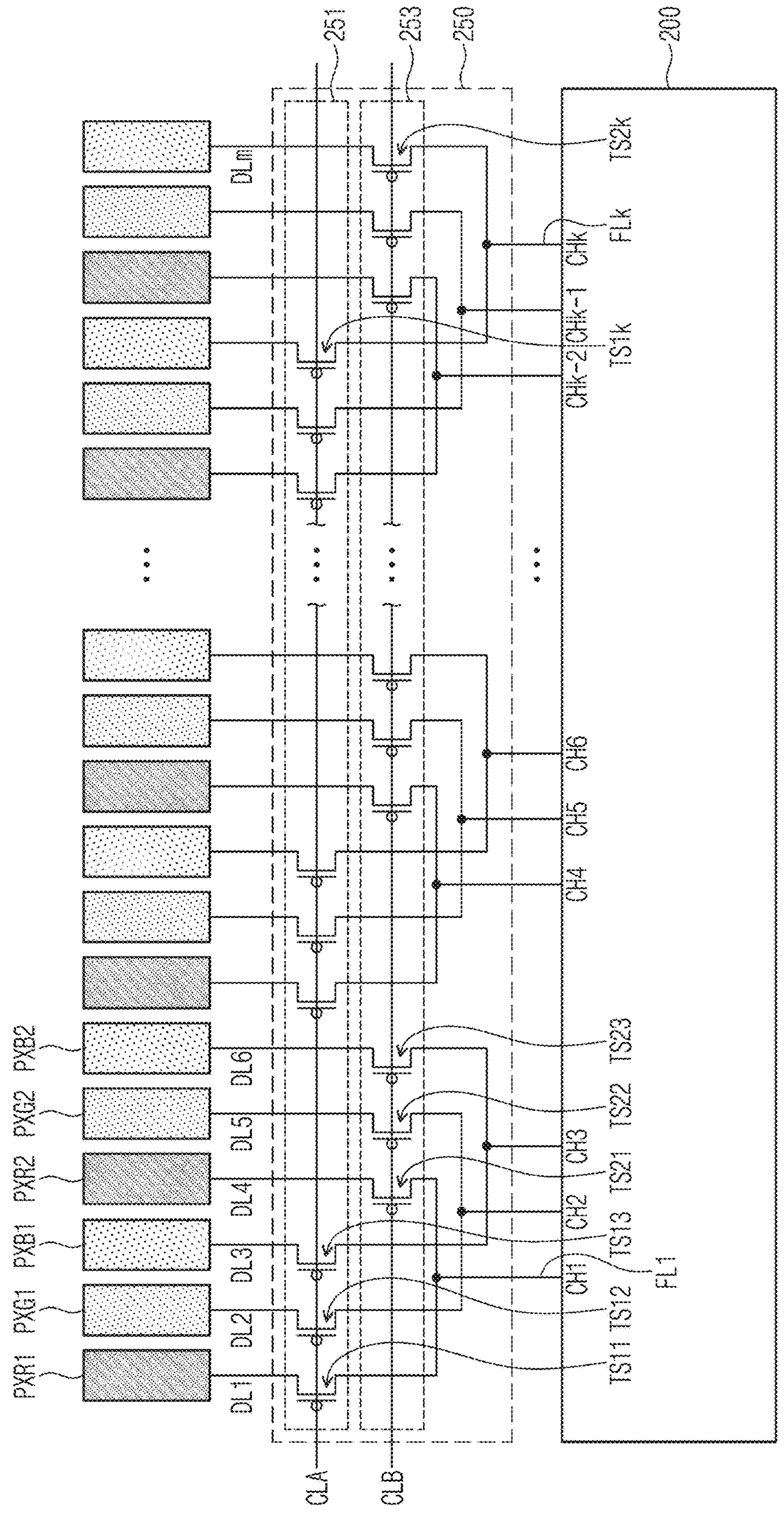
FIG. 4 is a block diagram showing a connection relationship between a data driving circuit and a selection circuit according to an embodiment of the present disclosure.

FIG. 4 is a block diagram showing a connection relationship between a data driving circuit and a selection circuit according to an embodiment of the present disclosure.

Referring to FIG. 4, the data driving circuit 200 may be connected to the selection circuit 250 through the fanout lines FL1 to FLk. The data driving circuit 200 may include a plurality of channels CH1, CH2, CH3, CH4, CH5, CH6, . . . , CHk-2, CHk-1, CHk which are respectively connected to the fanout lines FL1 to FLk. Each of the fanout lines FL1 to FLk may be selectively connected to the corresponding data line among the data lines DL1 to DLm through the selection circuit 250. As an example of the present disclosure, the number (k) of the fanout lines FL1 to FLk may be ½ of the number (m) of the data lines DL1 to DLm. However, the number of the fanout lines FL1 to FLk is not limited thereto, and may be changed to, for example, ⅓ or ¼ of the number (m) of the data lines DL1 to DLm.

The selection circuit 250 may include a plurality of switching circuits. As an example of the present disclosure, the selection circuit 250 includes a first switching circuit 251 and a second switching circuit 253. The first and second switching circuits 251 and 253 may be alternately activated with each other. A period in which the first switching circuit 251 is activated is referred to as a first selection period SP1 (see FIG. 6A). A period in which the second switching circuit 253 is activated is referred to as a second selection period SP2 (see FIG. 6A). The first and second switching circuits 251 and 253 may operate in a first manner in which the first and second selection periods SP1 and SP2 occur alternately. The first switching circuit 251 is activated during the first selection period SP1 to electrically connect the fanout lines FL1 to FLk to some (e.g., a first data line group) of the data lines DL1 to DLm. The second switching circuit 253 is activated during the second selection period SP2 to electrically connect the fanout lines FL1 to FLk to some (e.g., a second data line group) of the data lines DL1 to DLm.

Alternatively, the first and second switching circuits 251 and 253 may operate in a second manner different from the first manner. In the second method, the first and second selection periods SP1 and SP2 may occur while the order of the first selection period SP1 and the order of the second selection period SP2 are exchanged with each other in one respective horizontal scanning period 1H (see FIG. 6A). For example, the first and second switching circuits 251 and 253 may be activated in the order of "SP1→SP2→SP2→SP1".

The first switching circuit 251 includes a plurality of first switching transistors TS11 to TS1*k*. The second switching circuit 253 includes a plurality of second switching transistors TS21 to TS2*k*. The plurality of first switching transistors TS11 to TS1*k* is connected between the first data line group and the fanout lines FL1 to FLk. The plurality of second switching transistors TS21 to TS2*k* are connected between the second data line group and the fanout lines FL1 to FLk.

A first-first switching transistor TS11 among the plurality of first switching transistors TS11 to TS1*k* includes an input electrode connected to a first fanout line FL1 among the fanout lines FL1 to FLk, an output electrode connected to a first data line DL1 among the data lines DL1 to DLm, and a control electrode that receives a first selection signal CLA. A first-second switching transistor TS12 among the plurality of first switching transistors TS11 to TS1*k* includes an input electrode connected to a second fanout line FL2 among the fanout lines FL1 to FLk, an output electrode connected to a second data line DL2 of the data lines DL1 to DLm, and a control electrode that receives the first selection signal CLA. A first-third switching transistor TS13 among the plurality of first switching transistors TS11 to TS1*k* includes an input electrode connected to a third fanout line FL3 among the fanout lines FL1 to FLk, an output electrode connected to a third data line DL3 among the data lines DL1 to DLm, and a control electrode that receives the first selection signal CLA.

As an example of the present disclosure, the first to third data lines DL1, DL2, and DL3 may be connected to first to third pixels PXR1, PXG1, and PXB1, respectively. The first to third pixels PXR1, PXG1, and PXB1 may output different color light.

A second-first switching transistor TS21 among the plurality of second switching transistors TS21 to TS2*k* includes an input electrode connected to the first fanout line FL1 among the fanout lines FL1 to FLk, an output electrode connected to a fourth data line DLA of the data lines DL1 to DLm, and a control electrode that receives a second selection signal CLB. The second-second switching transistor TS22 among the plurality of second switching transistors TS21 to TS2*k* includes an input electrode connected to the second fanout line FL2 among the fanout lines FL1 to FLk, an output electrode connected to a fifth data line DL5 of the data lines DL1 to DLm, and a control electrode that receives the second selection signal CLB. The second-third switching transistor TS23 among the plurality of second switching transistors TS21 to TS2*k* includes an input electrode connected to the third fanout line FL3 among the fanout lines FL1 to FLk, an output electrode connected to a sixth data line DL6 of the data lines DL1 to DLm, and a control electrode that receives the second selection signal CLB.

As an example of the present disclosure, the fourth to sixth data lines DLA, DL5, and DL6 may be connected to fourth to sixth pixels PXR2, PXG2, and PXB2, respectively. The fourth to sixth pixels PXR2, PXG2, and PXB2 may output different color light. Each of the first and fourth pixels PXR1 and PXR2 may output first color light (e.g., red light), each of the second and fifth pixels PXG1 and PXG2 may output second color light (e.g., green light), and each of the third and sixth pixels PXB1 and PXB2 may output third color light (e.g., blue light).

When the first selection signal CLA is activated during the first selection period SP1, the first switching transistors TS11 to TS1*k* may be turned on, and data signals provided from the fanout lines FL1 to FLk may be applied to the first data line group through the first switching transistors TS11 to TS1*k*. When the second selection signal CLB is activated during the second selection period SP2, the second switching transistors TS21 to TS2*k* may be turned on, and data signals provided from the fanout lines FL1 to FLk may be applied to the second data line group through the second switching transistors TS21 to TS2*k*.

In an embodiment, each of the first and second switching transistors TS11 to TS1*k* and TS21 to TS2*k* may be a P-type transistor. However, an embodiment is not limited thereto, and each of the first and second switching transistors TS11 to TS1*k* and TS21 to TS2*k* may be an N-type transistor. When each of the first and second switching transistors TS11 to TS1*k* and TS21 to TS2*k* is the P-type transistor, the first and second selection signals CLA and CLB may have low levels during the first and second selection periods SP1 and SP2. On the other hand, when each of the first and second switching transistors TS11 to TS1*k* and TS21 to TS2*k* is the N-type transistor, the first and second selection signals CLA and CLB may have high levels during the first and second selection periods SP1 and SP2.

Figure 5:
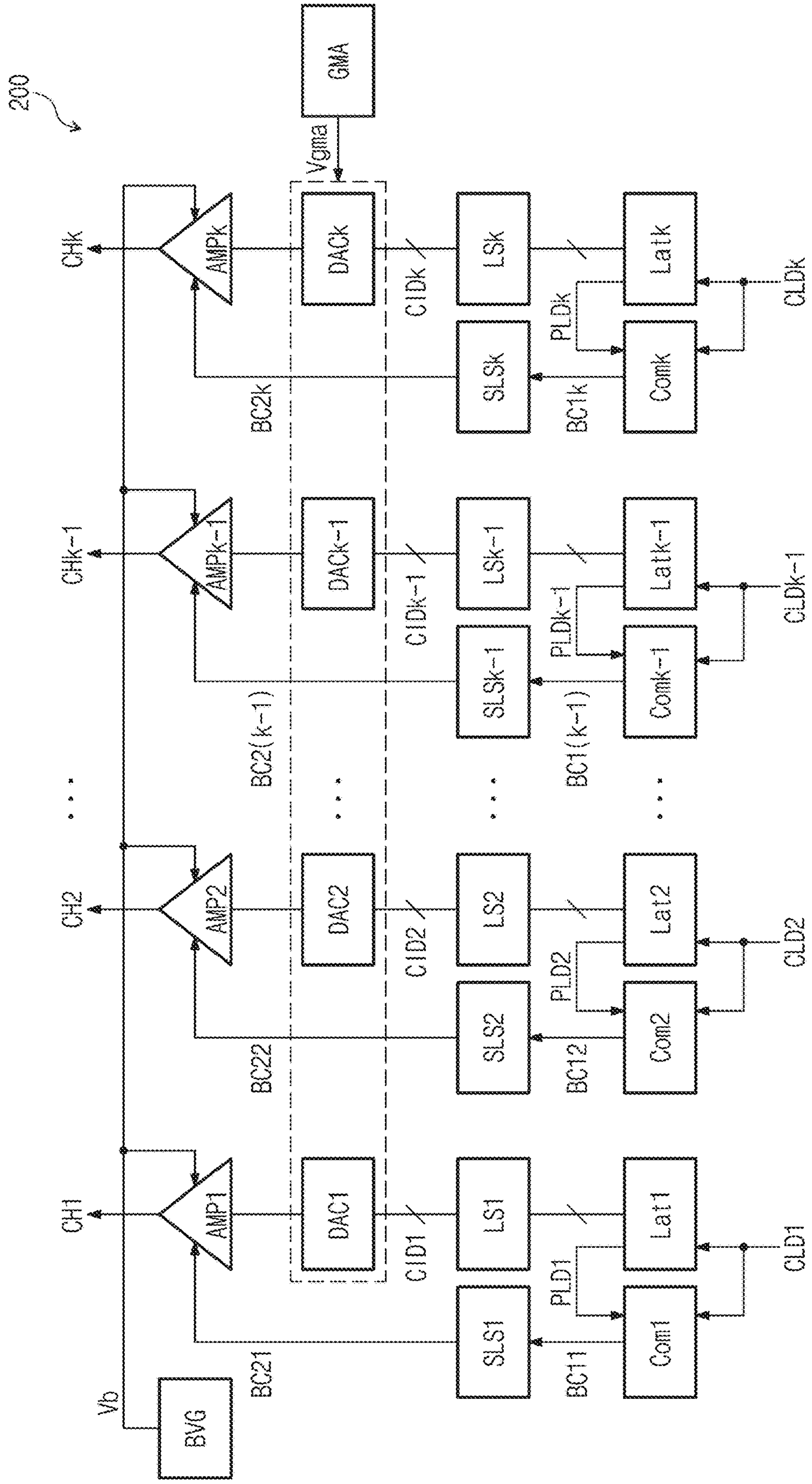
FIG. 5 is an internal block diagram of a data driving circuit according to an embodiment of the present disclosure.

FIG. 5 is a block diagram of a data driving circuit according to an embodiment of the present disclosure.

Referring to FIG. 5, the data driving circuit 200 includes a plurality of latches Lat1, Lat2 to Latk-1, and Latk, a plurality of comparison circuits Com1, Com2 to Comk-1, and Comk, a plurality of level shifting circuits LS1, LS2 to LSk-1, and LSk, a plurality of sub-level shifting circuits SLS1, SLS2 to SLSk-1, and SLSk, a plurality of digital-to-analog conversion circuits DAC1, DAC2 to DACk-1, and DACk, and a plurality of output buffers AMP1, AMP2 to AMPk-1, and AMPk.

The plurality of latches Lat1, Lat2 to Latk-1, and Latk store pieces of latch data, respectively. For example, among the plurality of latches Lat1, Lat2 to Latk-1, and Latk, a first latch Lat1 stores first latch data CLD1 among the pieces of latch data, and a second latch Lat2 stores second latch data CLD2 among the pieces of latch data. A (k-1)-th latch Latk-1 stores (k-1)-th latch data CLDk-1 among the pieces of latch data. The k-th latch Latk stores k-th latch data CLDk among the pieces of latch data. As an example of the present disclosure, each first to k-th latch data CLD1 to CLDk may be p bits digital data. Here, ‘p’ may be an integer of 1 or more.

The pieces of latch data may be stored sequentially in the plurality of latches Lat1, Lat2 to Latk-1, and Latk. In detail, after the first latch data CLD1 is stored in the first latch Lat1, the second latch data CLD2 is stored in the second latch Lat2. After the (k-1)-th latch data CLDk-1 is stored in the (k-1)-th latch Latk-1, the k-th latch data CLDk is stored in the k-th latch Latk. When the pieces of latch data are completely stored in all the latches Lat1, Lat2 to Latk-1, and Latk, the plurality of latches Lat1, Lat2 to Latk-1, and Latk may simultaneously output the pieces of latch data to the plurality of level shifting circuits LS1, LS2 to LSk-1, and LSk.

The plurality of level shifting circuits LS1, LS2 to LSk-1, and LSk may receive the pieces of latch data, may shift levels of the pieces of latch data to output pieces of image data, respectively. The first level shifting circuit LS1 shifts the level of the first latch data CLD1 to output first image data CID1. The second level shifting circuit LS2 shifts the level of the second latch data CLD2 to output second image data CID2. The (k-1)-th level shifting circuit LSk-1 shifts the level of the (k-1)-th latch data CLDk-1 to output (k-1)-th image data CIDk-1. The k-th level shifting circuit LSk shifts the level of the k-th latch data CLDk to output k-th image data CIDk. Each of the first to k-th image data CID1 to CIDk may be p bits digital data.

The plurality of digital-to-analog conversion circuits DAC1, DAC2 to DACk-1, and DACk convert the pieces of image data into analog data signals, respectively. Each of the plurality of digital-to-analog conversion circuits DAC1, DAC2 to DACk-1, and DACk receives a gamma reference voltage Vgma from a gamma voltage generator GMA and converts the corresponding image data into an analog data signal based on the gamma reference voltage Vgma. The data signal may be a voltage signal having a different voltage level depending on a gray level.

The plurality of output buffers AMP1, AMP2 to AMPk-1, and AMPk receive the analog data signals from the plurality of digital-to-analog conversion circuits DAC1, DAC2 to DACk-1, and DACk, respectively. The plurality of output buffers AMP1, AMP2 to AMPk-1, and AMPk are connected to the plurality of channels CK1, CH2 to CHk-1, and CHk, respectively. Each of the plurality of output buffers AMP1, AMP2 to AMPk-1, and AMPk may receive a bias voltage Vb from a bias voltage generator BVG. The plurality of output buffers AMP1, AMP2 to AMPk-1, and AMPk may output the data signals to the plurality of channels CK1, CH2 to CHk-1, and CHk, respectively.

The plurality of comparison circuits Com1, Com2 to Comk-1, and Comk are positioned to correspond to the plurality of latches Lat1, Lat2 to Latk-1, and Latk, respectively. When latch data CLD1, CLD2, . . . , CLDk-1, and CLDk are respectively stored in the plurality of latches Lat1, Lat2 to Latk-1, and Latk, each of the plurality of comparison circuits Com1, Com2 to Comk-1, and Comk may receive latch data corresponding thereto. For example, among the plurality of comparison circuits Com1, Com2 to Comk-1, and Comk, a first comparison circuit Com1 receives the first latch data CLD1 (or, referred to as first present latch data), and a second comparison circuit Com2 receives the second latch data CLD2 (or, referred to as second present latch data). A (k-1)-th comparison circuit Comk-1 receives the (k-1)-th latch data CLDk-1 (or, referred to as (k-1)-th present latch data), and a k-th comparison circuit Comk receives the k-th latch data CLDk (or, referred to as k-th present latch data). The plurality of comparison circuits Com1, Com2 to Comk-1, and Comk may also receive previous latch data PLD1, PLD2, PLDk-1, and PLDk from the latches Lat1, Lat2, . . . , Latk-1, and Latk, respectively.

Each of the plurality of comparison circuits Com1, Com2 to Comk-1, and Comk compares present latch data with the previous latch data and outputs a first bias current control signal depending on the comparison result. Each of the plurality of comparison circuits Com1, Com2 to Comk-1, and Comk compare ‘q’ upper bits of the present latch data with ‘q upper bits of the previous latch data and outputs a first bias current control signal depending on the comparison result. Here, ‘q’ is an integer greater than or equal to 1, and smaller than ‘p’. For example, when ‘p’ is 8, ‘q’ may be 2, 3, or 4.

The first comparison circuit Com1 compares the first present latch data CLD1 and first previous latch data PLD1 which was pre-stored, and outputs a first-first bias current control signal BC11 depending on the comparison result. The first previous latch data PLD1 may be first latch data received from the first latch Lat1 during a previous horizontal scanning period. The second comparison circuit Com2 compares the second present latch data CLD2 and second previous latch data PLD2 which was pre-stored, and outputs a first-second bias current control signal BC12 depending on the comparison result. The second previous latch data PLD2 may be second latch data received from the second latch Lat2 during the previous horizontal scanning period. The (k-1)-th comparison circuit Comk-1 compares the (k-1)-th present latch data CLDk-1 and (k-1)-th previous latch data PLDk-1 which was pre-stored, and outputs a first-(k-1)-th bias current control signal BC1 (k-1) depending on the comparison result. The (k-1)-th previous latch data PLDk-1 may be the (k-1)-th latch data received from the (k-1)-th latch Latk-1 during the previous horizontal scanning period. The k-th comparison circuit Comk compares the k-th present latch data CLDk and k-th previous latch data PLDk which was pre-stored, and outputs a first-k-th bias current control signal BC1*k* depending on the comparison result. The k-th previous latch data PLDk may be the k-th latch data received from the k-th latch Latk during the previous horizontal scanning period.

The plurality of sub-level shifting circuits SLS1, SLS2 to SLSk-1, and SLSk may receive a plurality of first bias current control signals from the plurality of comparison circuits Com1, Com2 to Comk-1, and Comk, may shift levels of the plurality of first bias current control signals, and may output a plurality of second bias current control signals. The first sub-level shifting circuit SLS1 shifts the level of the first-first bias current control signal BC11 to output second-first bias current control signal BC21. The second sub-level shifting circuit SLS2 shifts the level of the first-second bias current control signal to output second-second bias current control signal BC22. The (k-1)-th sub-level shifting circuit SLSk-1 shifts a level of the first-(k-1)-th bias current control signal BC1 (k-1) to output a second-(k-1)-th bias current control signal BC2 (k-1). The k-th sub-level shifting circuit SLSk shifts a level of the first-k-th bias current control signal BC1*k* to output second-k-th bias current control signal BC2*k*.

The plurality of output buffers AMP1, AMP2 to AMPk-1, and AMPk may receive the plurality of second bias current control signals, respectively. Each of the plurality of output buffers AMP1, AMP2 to AMPk-1, and AMPk may control the bias current consumed in the corresponding output buffer by controlling the bias voltage Vb in response to the corresponding second bias current control signal. In detail, the first output buffer AMP1 may control the bias voltage Vb in response to the second-first bias current control signal BC21, thereby controlling the bias current consumed in the first output buffer AMP1. The second output buffer AMP2 may control the bias voltage Vb in response to the second-second bias current control signal BC22, thereby controlling the bias current consumed in the second output buffer AMP2. The (k-1)-th output buffer AMPk-1 may control the bias voltage Vb in response to the second-(k-1)-th bias current control signal BC2 (k-1), thereby controlling the bias current consumed in the (k-1)-th output buffer AMPk-1. The k-th output buffer AMPk may control the bias voltage Vb in response to the second-k-th bias current control signal BC2*k*, thereby controlling the bias current consumed in the k-th output buffer AMPk.

The plurality of output buffers AMP1, AMP2 to AMPk-1, and AMPk may output data signals through channels CH1, CH2 to CHk-1, and CHk in response to an output enable signal. The output enable signal may be a signal included in the data control signal DCS (see FIG. 3) provided from the driving controller 100 (see FIG. 3) to the data driving circuit 200.

Figure 6A:
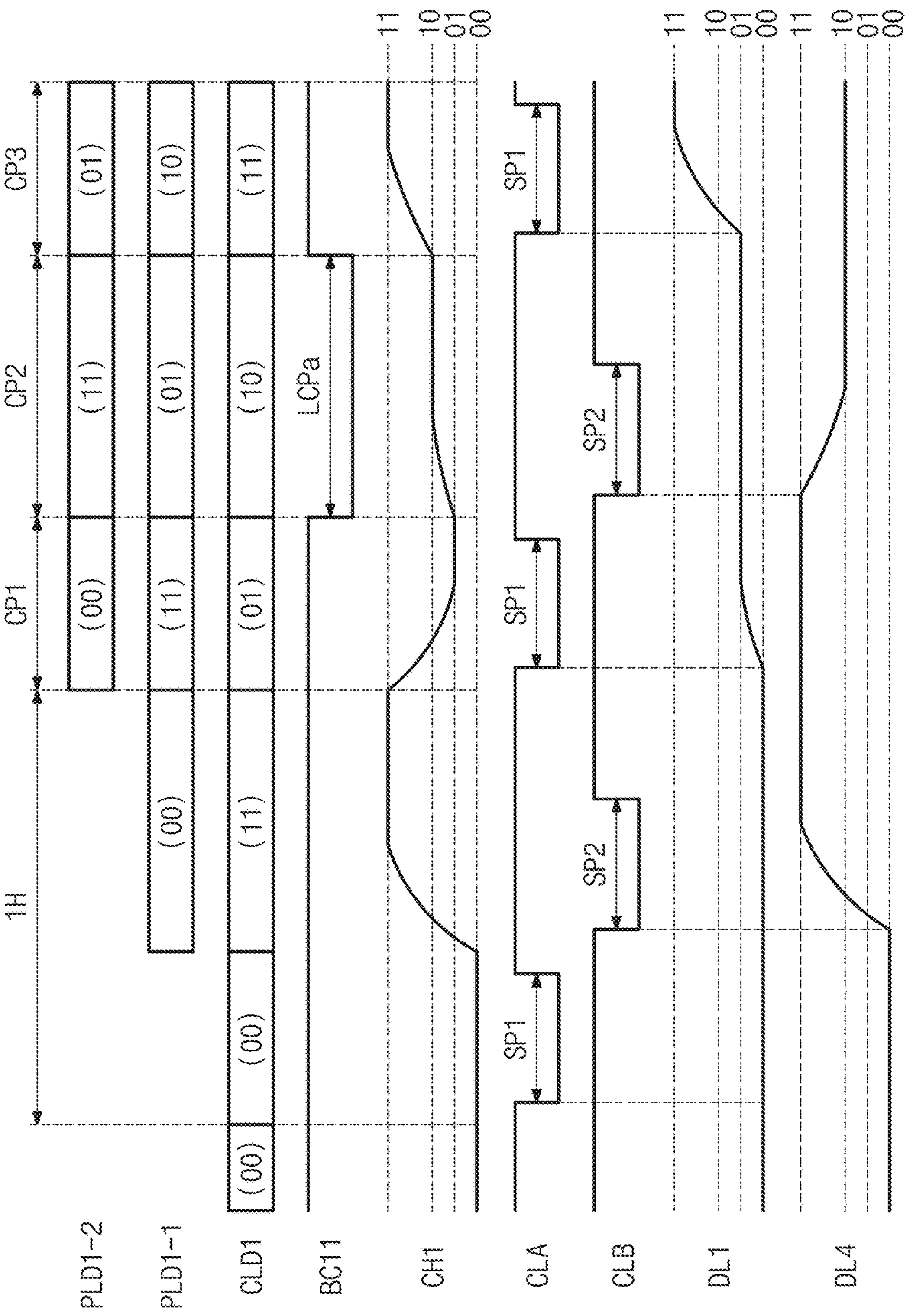
FIGS. 6A and 6B are waveform diagrams for describing an operation of a data driving circuit connected to a selection circuit operating in a first method according to an embodiment of the present disclosure.
Figure 6B:
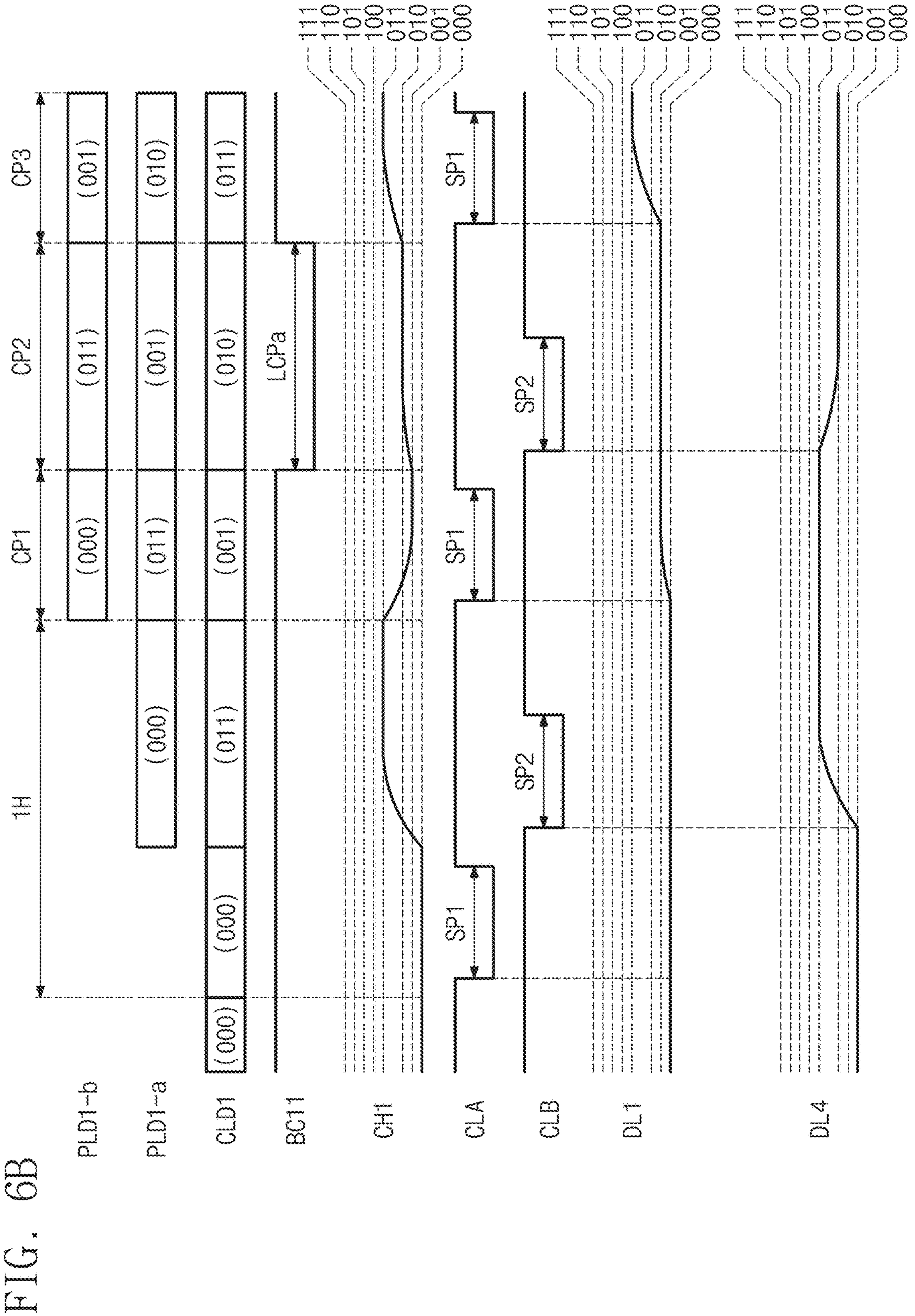

FIGS. 6A and 6B are waveform diagrams for describing an operation of a data driving circuit connected to a selection circuit operating in a first method according to an embodiment of the present disclosure. FIG. 6A shows a case where each comparison circuit compares two upper bits of present latch data with two upper bits of previous latch data. FIG. 6B shows a case where each comparison circuit compares three upper bits of present latch data with three upper bits of previous latch data.

Referring to FIGS. 4, 5, and 6A, a first data signal output through the first channel CH1 may be applied to a first data line DL1 through the first switching circuit 251 during the first selection period SP1 and may be applied to the fourth data line DL4 through the second switching circuit 253 during the second selection period SP2. For example, the first and second switching circuits 251 and 253 may be activated in the order of "SP1→SP2→SP1→SP2". During the second selection period SP2, the first data line DL1 maintains the first data signal applied in the previous first selection period SP1. During the first selection period SP1, the fourth data line DLA maintains the first data signal applied in the previous second selection period SP2.

Each of the plurality of comparison circuits Com1, Com2 to Comk-1, and Comk compares present latch data with pre-stored previous latch data and outputs a first bias current control signal depending on the comparison result. As an example of the present disclosure, when the present latch data CLD1 is referred to as N-th latch data, the previous latch data may include (N-1)-th previous latch data latched in a (N-1)-th order and (N-2)-th previous latch data latched in a (N-2)-th order. Each of the plurality of comparison circuits Com1, Com2 to Comk-1, and Comk compares two upper bits of the present latch data with two upper bits of the (N-1)-th previous latch data, and compares the two upper bits of the present latch data with two upper bits of the (N-2)-th previous latch data.

The first comparison circuit Com1 may generate a first comparison result by comparing the first present latch data CLD1 and the first-first previous latch data PLD1-1, and may generate a second comparison result by comparing the first present latch data CLD1 and the first-second previous latch data PLD1-2. The first comparison circuit Com1 generates a final comparison result by combining the first and second comparison results, and outputs the first-first bias current control signal BC11 depending on the final comparison result.

As an example of the present disclosure, when a difference between two upper bits of the first present latch data CLD1 and two upper bits of first-first previous latch data PLD1-1 is less than or equal to a reference value (e.g., 1 bit), the first comparison result may have a state of logic "1". When the difference exceeds the reference value (e.g., 1 bit), the first comparison result may have a state of logic "0". When a difference between the two upper bits of the first present latch data CLD1 and two upper bits of first-second previous latch data PLD1-2 is less than or equal to the reference value (e.g., 1 bit), the second comparison result may have a state of logic "1". When the difference exceeds the reference value (e.g., 1 bit), the second comparison result may have a state of logic "0".

In a first comparison period CP1, because the two upper bits of the first present latch data CLD1 are "01", and the two upper bits of the first-first previous latch data PLD1-1 are "11", a difference between "01" and "11" exceeds 1 bit. Accordingly, the first comparison result has a state of logic "0". In the first comparison period CP1, because the two upper bits of the first present latch data CLD1 are "01", and the two upper bits of the first-second previous latch data PLD1-2 are "00", a difference between "01" and "00" corresponds to 1 bit. Accordingly, the second comparison result has a state of logic “1”. When at least one of the first and second comparison results is logic “0”, the first comparison circuit Com1 may generate logic “0” as the final comparison result. Accordingly, the first-first bias current control signal BC11 may remain in an inactive state.

In a second comparison period CP2, because the two upper bits of the first present latch data CLD1 are “10”, and the two upper bits of the first-first previous latch data PLD1-1 are “01”, a difference between “10” and “01” corresponds to 1 bit. Accordingly, the first comparison result has a state of logic “1”. In the second comparison period CP2, because the two upper bits of the first present latch data CLD1 are “10”, and the two upper bits of the first-second previous latch data PLD1-2 are “11”, a difference between “10” and “11” corresponds to 1 bit. Accordingly, the second comparison result has a state of logic “1”. When both the first and second comparison results are logic “1”, the first comparison circuit Com1 may generate logic “1” as the final comparison result. Accordingly, the state of the first-first bias current control signal BC11 may be switched to an active state. An activation period of the first-first bias current control signal BC11 may be defined as a low-power period LCPa in which the first output buffer AMP1 operates with a low bias current.

In a third comparison period CP3, because the two upper bits of the first present latch data CLD1 are “11”, and the two upper bits of the first-first previous latch data PLD1-1 are “10”, a difference between “11” and “10” corresponds to 1 bit. Accordingly, the first comparison result has a state of logic “1”. In the third comparison period CP3, because the two upper bits of the first present latch data CLD1 are “11”, and the two upper bits of the first-second previous latch data PLD1-2 are “01”, a difference between “11” and “01” exceeds 1 bit. Accordingly, the second comparison result has a state of logic “0”. When at least one of the first and second comparison results is logic “0”, the first comparison circuit Com1 may generate logic “0” as the final comparison result. Accordingly, the state of the first-first bias current control signal BC11 may be switched to an inactive state.

Referring to FIGS. 5 and 6B, each of the plurality of comparison circuits Com1, Com2 to Comk-1, and Comk compares three upper bits of present latch data with three upper bits of (N-1)-th previous latch data, and compares the three upper bits of the present latch data with three upper bits of the (N-2)-th previous latch data.

The first comparison circuit Com1 may generate a first comparison result by comparing the first present latch data CLD1 and the first-first previous latch data PLD1-*a*, and may generate a second comparison result by comparing the first present latch data CLD1 and the first-second previous latch data PLD1-*b*. The first comparison circuit Com1 generates a final comparison result by combining the first and second comparison results, and outputs the first-first bias current control signal BC11 depending on the final comparison result.

As an example of the present disclosure, when a difference between three upper bits of the first present latch data CLD1 and three upper bits of the first-first previous latch data PLD1-*a* is less than or equal to 1 bit, the first comparison result may have a state of logic “1”. When the difference exceeds 1 bit, the first comparison result may have a state of logic “0”. When a difference between the three upper bits of the first present latch data CLD1 and three upper bits of the first-second previous latch data PLD1-*b* is less than or equal to 1 bit, the second comparison result may have a state of logic “1”. When the difference exceeds 1 bit, the second comparison result may have a state of logic “0”.

In a first comparison period CP1, because the three upper bits of the first present latch data CLD1 are “001”, and the three upper bits of the first-first previous latch data PLD1-*a* are “011”, a difference between “001” and “011” exceeds 1 bit. Accordingly, the first comparison result has a state of logic “0”. In the first comparison period CP1, because the three upper bits of the first present latch data CLD1 are “001”, and the three upper bits of the first-second previous latch data PLD1-*b* are “000”, a difference between “001” and “000” corresponds to 1 bit. Accordingly, the second comparison result has a state of logic “1”. When at least one of the first and second comparison results is logic “0”, the first comparison circuit Com1 may generate logic “0” as the final comparison result. Accordingly, the first-first bias current control signal BC11 may remain in an inactive state.

In a second comparison period CP2, because the three upper bits of the first present latch data CLD1 are “010”, and the three upper bits of the first-first previous latch data PLD1-*a* are “001”, a difference between “010” and “001” corresponds to 1 bit. Accordingly, the first comparison result has a state of logic “1”. In the second comparison period CP2, because the three upper bits of the first present latch data CLD1 are “010”, and the three upper bits of the first-second previous latch data PLD1-*b* are “011”, a difference between “010” and “011” corresponds to 1 bit. Accordingly, the second comparison result has a state of logic “1”. When both the first and second comparison results are logic “1”, the first comparison circuit Com1 may generate logic “1” as the final comparison result. Accordingly, the state of the first-first bias current control signal BC11 may be switched to an active state. An activation period of the first-first bias current control signal BC11 may be defined as a low-power period LCPa in which the first output buffer AMP1 operates with a low bias current.

In a third comparison period CP3, because the three upper bits of the first present latch data CLD1 are “011”, and the three upper bits of the first-first previous latch data PLD1-*a* are “010”, a difference between “011” and “010” corresponds to 1 bit. Accordingly, the first comparison result has a state of logic “1”. In the third comparison period CP3, because the three upper bits of the first present latch data CLD1 are “011”, and the three upper bits of the first-second previous latch data PLD1-*b* are “001”, a difference between “011” and “001” exceeds 1 bit. Accordingly, the second comparison result has a state of logic “0”. When at least one of the first and second comparison results is logic “0”, the first comparison circuit Com1 may generate logic “0” as the final comparison result. Accordingly, the state of the first-first bias current control signal BC11 may be switched to an inactive state.

In FIGS. 6A and 6B, only the current control process of the first output buffer AMP1 connected to the first channel CH1 is described. However, the current control process of each of the second to k-th output buffer AMP2 to AMPk (see FIG. 5) connected to the second to k-th channel CH1 to CHk (see FIG. 5) may be performed similarly.

In FIGS. 6A and 6B, the case where the reference value is 1 bit is described, but the reference value may not be limited thereto. For example, when each of the comparison circuits Com1, Com2 to Comk-1, and Comk compares four upper bits of present latch data with four upper bits of previous latch data, the reference value may be set to 2 bits.

As such, the data driving circuit 200 may compare latch data corresponding to each channel with previous latch data and may control a bias current of an output buffer connected to each channel depending on the comparison result. In other words, the power consumption of each of the plurality of output buffers AMP1 to AMPk provided in the data driving circuit 200 may be individually controlled, thereby efficiently reducing the overall power consumption of the data driving circuit 200.

Figure 7A:
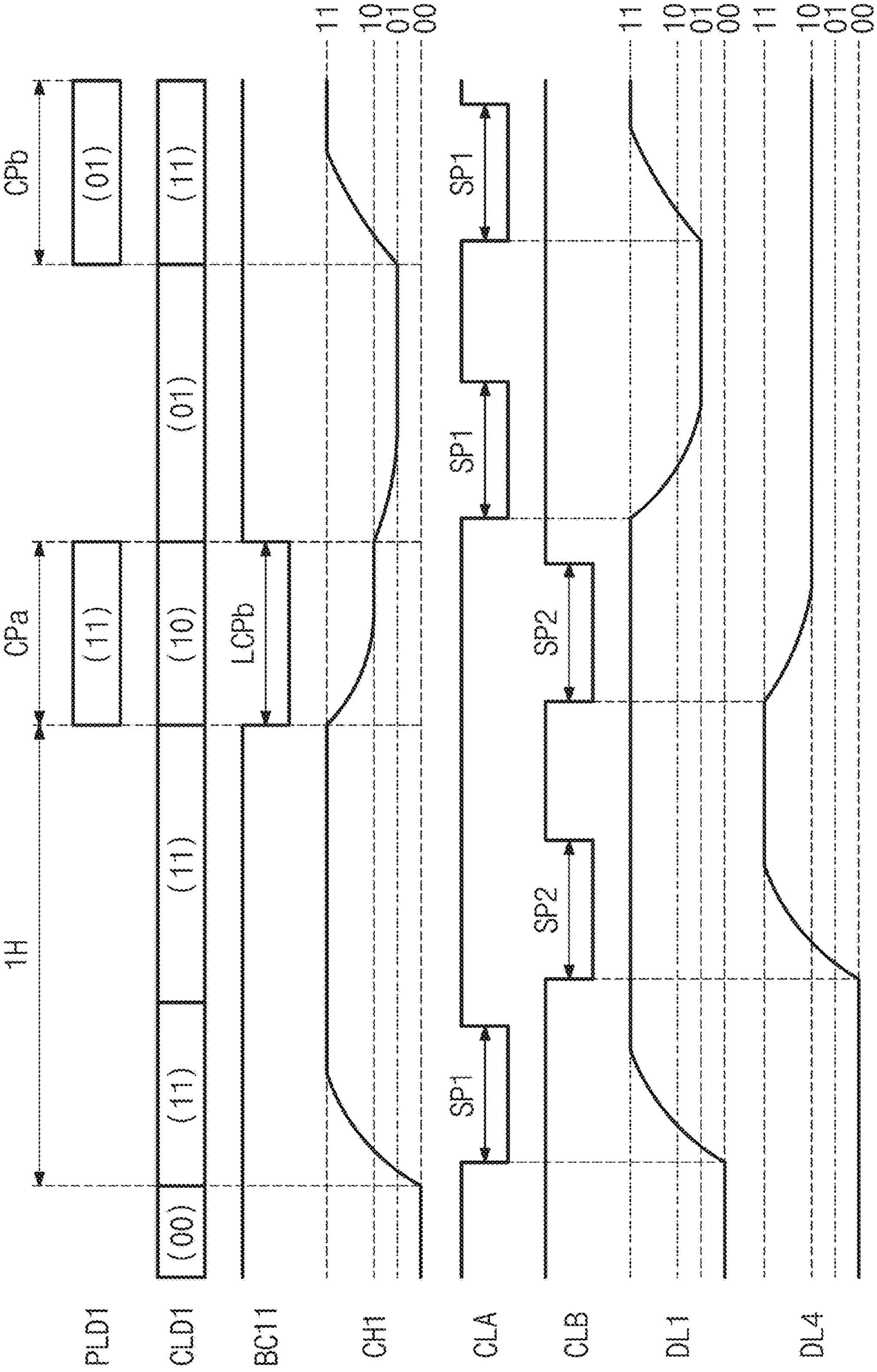
FIGS. 7A and 7B are waveform diagrams for describing an operation of a data driving circuit connected to a selection circuit operating in a second method according to an embodiment of the present disclosure.
Figure 7B:
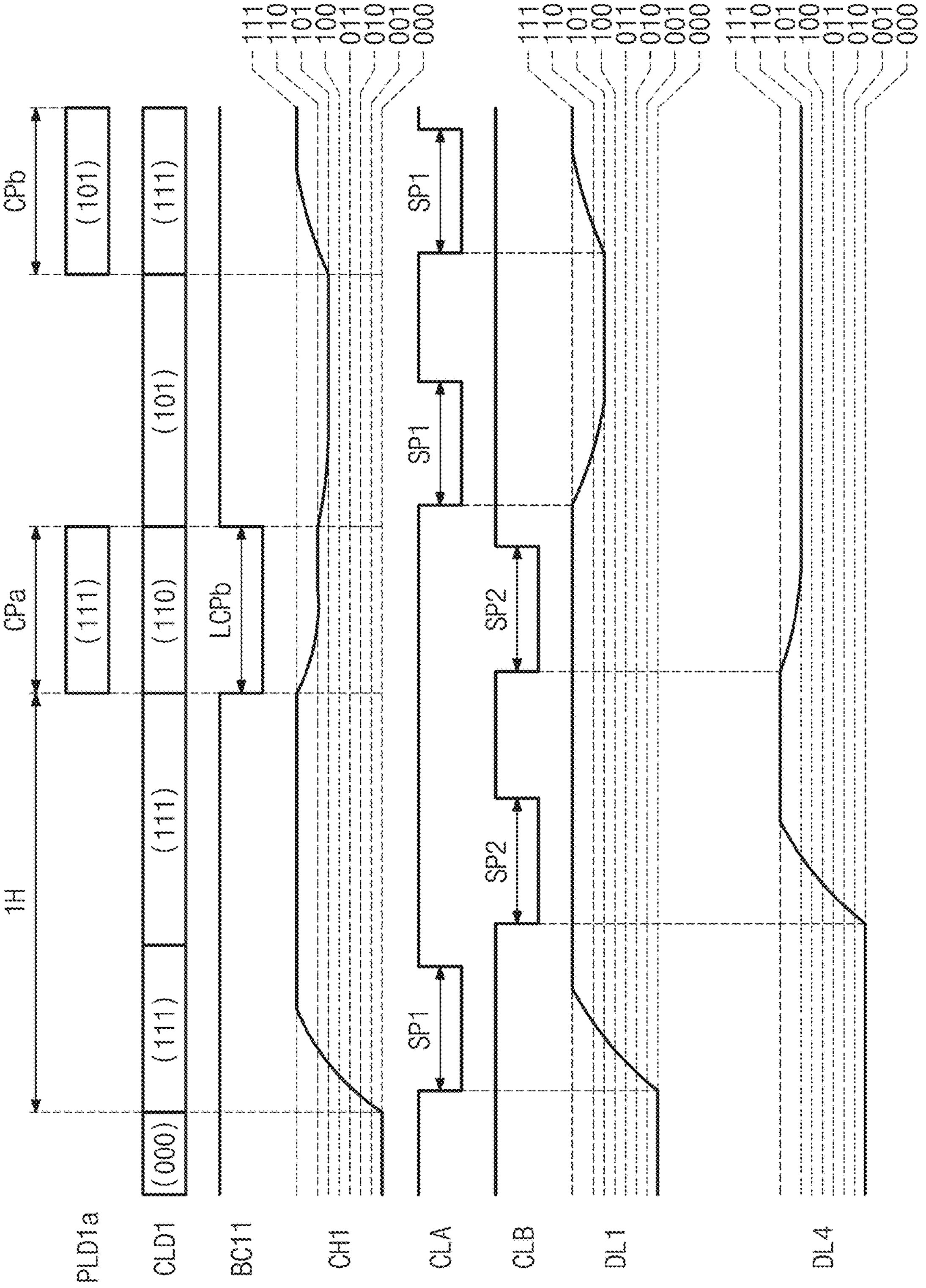

FIGS. 7A and 7B are waveform diagrams for describing an operation of a data driving circuit connected to a selection circuit operating in a second method according to an embodiment of the present disclosure. FIG. 7A shows a case where each comparison circuit compares two upper bits of present latch data with two upper bits of previous latch data. FIG. 7B shows a case where each comparison circuit compares three upper bits of present latch data with three upper bits of previous latch data.

Referring to FIGS. 4, 5, and 7A, in a second method, two first selection periods SP1 and two second selection periods SP2 occur alternately. In other words, the first and second selection periods SP1 and SP2 may sequentially occur in one horizontal period and the second and first selection periods SP2 and SP1 may occur in a horizontal period subsequent to the one horizontal period. For example, the first and second switching circuits 251 and 253 may be activated in the order of "SP1→SP2→SP2→SP1".

The data driving circuit 200 connected to the selection circuit 250 operating in the second method may perform a comparison operation in units of one horizontal scanning period 1H. In detail, each of the plurality of comparison circuits Com1, Com2 to Comk-1, and Comk may compare present latch data and pre-stored previous latch data in one horizontal scanning period 1H.

As an example of the present disclosure, each of the plurality of comparison circuits Com1, Com2 to Comk-1, and Comk compares two upper bits of the present latch data with two upper bits of the previous latch data. When the present latch data is referred to as N-th latch data, the previous latch data may be previous latch data latched in the (N-1)-th order.

The first comparison circuit Com1 may generate a comparison result by comparing the first present latch data CLD1 and the first previous latch data PLD1. The first comparison circuit Com1 outputs the first-first bias current control signal BC11 depending on the comparison result.

In a first comparison period CPa, because the two upper bits of the first present latch data CLD1 are "10", and the two upper bits of the previous latch data PLD1 are "11", a difference between "10" and "11" corresponds to 1 bit. Accordingly, the comparison result has a state of logic "1". Accordingly, the state of the first-first bias current control signal BC11 may be switched to an active state. An activation period of the first-first bias current control signal BC11 may be defined as a low-power period LCPb in which the first output buffer AMP1 operates with a low bias current.

In a second comparison period CPb, because the two upper bits of the first present latch data CLD1 are "11", and the two upper bits of the previous latch data PLD1 are "01", a difference between "11" and "01" exceeds 1 bit. Accordingly, the comparison result has a state of logic "0". Accordingly, the state of the first-first bias current control signal BC11 may be switched to an inactive state.

Referring to FIGS. 5 and 7B, each of the plurality of comparison circuits Com1, Com2 to Comk-1, and Comk compares three upper bits of the present latch data with three upper bits of the previous latch data. When the present latch data is referred to as N-th latch data, the previous latch data may be previous latch data latched in the (N-1)-th order.

The first comparison circuit Com1 may generate a comparison result by comparing the first present latch data CLD1 and the first previous latch data PLD1*a*. The first comparison circuit Com1 outputs the first-first bias current control signal BC11 depending on the comparison result.

In the first comparison period CPa, because three upper bits of the first present latch data CLD1 are "110", and three upper bits of the first previous latch data PLD1*a* are "111", a difference between "110" and "111" corresponds to 1 bit. Accordingly, the comparison result has a state of logic "1". Accordingly, the state of the first-first bias current control signal BC11 may be switched to an active state. An activation period of the first-first bias current control signal BC11 may be defined as a low-power period LCPb in which the first output buffer AMP1 operates with a low bias current.

In the second comparison period CPb, because the three upper bits of the first present latch data CLD1 are "111", and the three upper bits of the first previous latch data PLD1*a* are "101", a difference between "111" and "101" exceeds 1 bit. Accordingly, the comparison result has a state of logic "0". Accordingly, the state of the first-first bias current control signal BC11 may be switched to an inactive state.

As such, the data driving circuit 200 may compare latch data corresponding to each channel with previous latch data and may control a bias current of an output buffer connected to each channel depending on the comparison result. In other words, the power consumption of each of the plurality of output buffers AMP1 to AMPk provided in the data driving circuit 200 may be individually controlled, thereby efficiently reducing the overall power consumption of the data driving circuit 200.

Figure 8A:
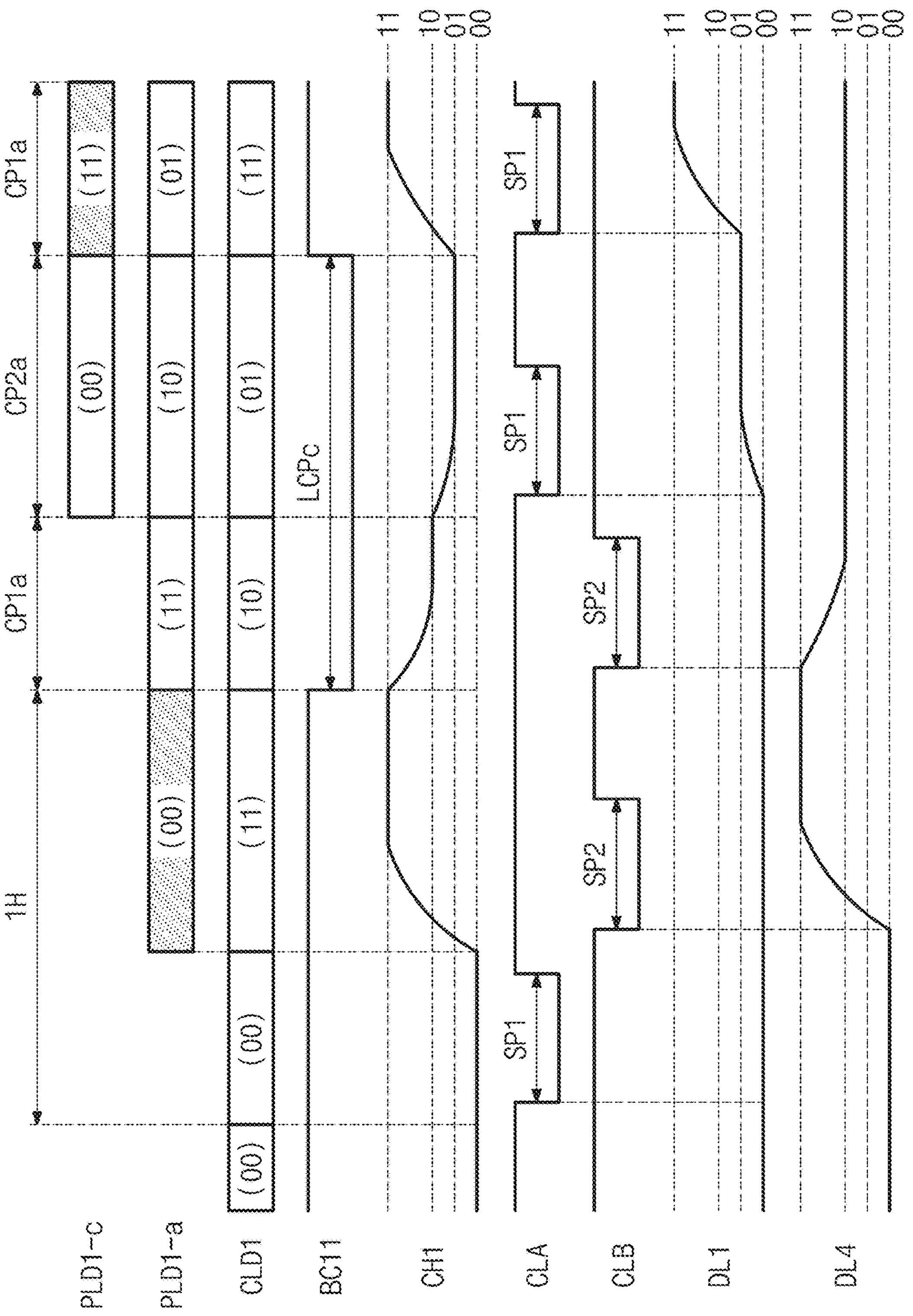
FIGS. 8A and 8B are waveform diagrams for describing an operation of a data driving circuit connected to a selection circuit operating in a second method according to an embodiment of the present disclosure.
Figure 8B:
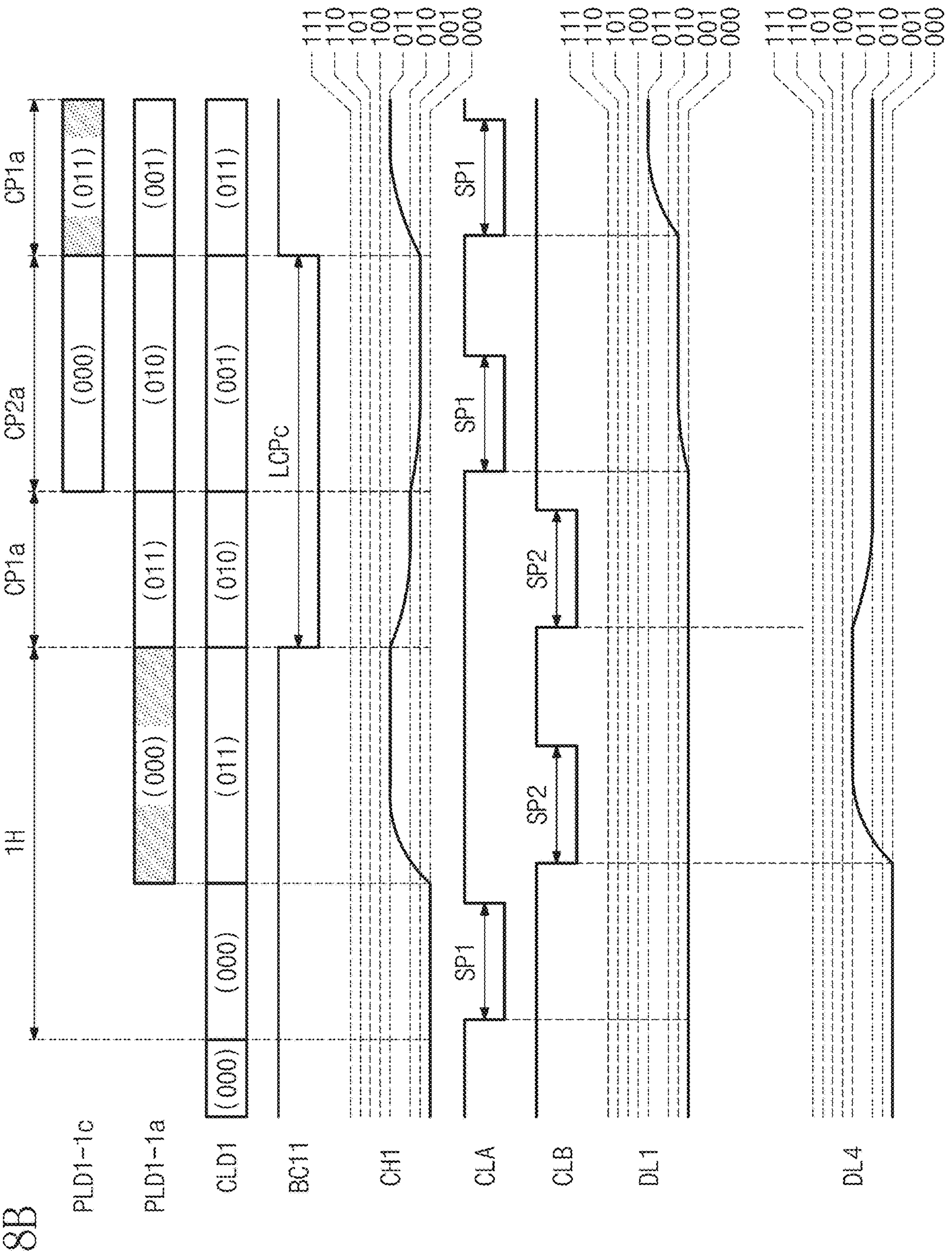

FIGS. 8A and 8B are waveform diagrams for describing an operation of a data driving circuit connected to a selection circuit operating in a second method according to an embodiment of the present disclosure. FIG. 8A shows a case where each comparison circuit compares two upper bits of present latch data with two upper bits of previous latch data. FIG. 8B shows a case where each comparison circuit compares three upper bits of present latch data with three upper bits of previous latch data.

Referring to FIGS. 4, 5, and 8A, in a second method, the first and second selection periods SP1 and SP2 may occur while the order of the first selection period SP1 and the order of the second selection period SP2 are exchanged with each other in one respective horizontal scanning period 1H. For example, the first and second switching circuits 251 and 253 may be activated in the order of "SP1→SP2→SP2→SP1".

The data driving circuit 200 connected to the selection circuit 250 operating in the second method may perform a comparison operation in units of one horizontal scanning period 1H. As an example of the present disclosure, the one horizontal scanning period 1H may include a first comparison period CP1*a* and a second comparison period CP2*a*. During the first comparison period CP1*a* of the one horizontal scanning period 1H, each of the plurality of comparison circuits Com1, Com2 to Comk-1, and Comk may compare present latch data and previous latch data by using a first comparison method. During the second comparison period CP2*a* of the one horizontal scanning period 1H, each of the plurality of comparison circuits Com1, Com2 to Comk-1, and Comk may compare present latch data and previous latch data by using a second comparison method.

As an example of the present disclosure, each of the plurality of comparison circuits Com1, Com2 to Comk-1, and Comk compares two upper bits of the present latch data with two upper bits of the previous latch data. When the present latch data CLD1 is referred to as N-th latch data, the previous latch data may include (N-1)-th previous latch data latched in the (N-1)-th order and (N-3)-th previous latch data latched in the (N-3)-th order. The first comparison method may be a method of generating the comparison result by comparing the present latch data and the (N-1)-th previous latch data, and outputting a first bias current control signal depending on the comparison result. The second comparison method may be a method that generates a first comparison result by comparing the present latch data and the (N-1)-th previous latch data, generates a third comparison result by comparing the present latch data and the (N-3)-th previous latch data, generates a final comparison result by combining the first and third comparison results, and outputs a first bias current control signal depending on the final comparison result.

During the first comparison period CP1*a*, the first comparison circuit Com1 generates a comparison result by comparing the first present latch data CLD1 and a first-first previous latch data PLD1-*a*, and outputs the first-first bias current control signal BC11 depending on the comparison result. In the first comparison period CP1*a*, because the two upper bits of the first present latch data CLD1 are "10", and the two upper bits of the first-first previous latch data PLD1-*a* are "11", a difference between "10" and "11" corresponds to 1 bit. Accordingly, the comparison result has a state of logic "1". Accordingly, the state of the first-first bias current control signal BC11 may be switched to an active state.

Afterward, during the second comparison period CP2*a*, the first comparison circuit Com1 may generate a first comparison result by comparing the first present latch data CLD1 and the first-first previous latch data PLD1-*a*, and may generate a third comparison result by comparing the first present latch data CLD1 and the first-third previous latch data PLD1-*c*. The first comparison circuit Com1 generates a final comparison result by combining the first and third comparison results, and outputs the first-first bias current control signal BC11 depending on the final comparison result.

In the second comparison period CP2*a*, because the two upper bits of the first present latch data CLD1 are "01", and the two upper bits of the first-first previous latch data PLD1-*a* are "10", a difference between "01" and "10" corresponds to 1 bit. Accordingly, the first comparison result has a state of logic "1". Moreover, in the second comparison period CP2*a*, because the two upper bits of the first present latch data CLD1 are "01", and the two upper bits of the first-third previous latch data PLD1-*c* are "00", a difference between "01" and "00" corresponds to 1 bit. Accordingly, the third comparison result has a state of logic "1". When both the first and third comparison results are logic "1", the first comparison circuit Com1 may generate logic "1" as the final comparison result. Accordingly, the first-first bias current control signal BC11 may remain in an active state. An activation period of the first-first bias current control signal BC11 may be defined as a low-power period LCPc in which the first output buffer AMP1 operates with a low bias current.

Next, during the first comparison period CP1*a*, because the two upper bits of the first present latch data CLD1 are "11", and the two upper bits of the first-first previous latch data PLD1-*a* are "01", a difference between "11" and "01" exceeds 1 bit. Accordingly, the comparison result has a state of logic "0". Accordingly, the state of the first-first bias current control signal BC11 may be switched to an inactive state.

Referring to FIGS. 5 and 8B, each of the plurality of comparison circuits Com1, Com2 to Comk-1, and Comk compares three upper bits of the present latch data with three upper bits of the previous latch data. When the present latch data CLD1 is referred to as N-th latch data, the previous latch data may include (N-1)-th previous latch data latched in the (N-1)-th order and (N-3)-th previous latch data latched in the (N-3)-th order. The first comparison method may be a method of generating the comparison result by comparing the present latch data and the (N-1)-th previous latch data, and outputting a first bias current control signal depending on the comparison result. The second comparison method may be a method that generates a first comparison result by comparing the present latch data and the (N-1)-th previous latch data, generates a third comparison result by comparing the present latch data and the (N-3)-th previous latch data, generates a final comparison result by combining the first and third comparison results, and outputs a first bias current control signal depending on the final comparison result.

During the first comparison period CP1*a*, the first comparison circuit Com1 generates a comparison result by comparing the first present latch data CLD1 and the first-first previous latch data PLD1-1*a* and outputs the first-first bias current control signal BC11 depending on the comparison result. In the first comparison period CP1*a*, because the three upper bits of the first present latch data CLD1 are "010", and the three upper bits of the first-first previous latch data PLD1-1*a* are "011", a difference between "010" and "011" corresponds to 1 bit. Accordingly, the comparison result has a state of logic "1". Accordingly, the state of the first-first bias current control signal BC11 may be switched to an active state.

Afterward, during the second comparison period CP2*a*, the first comparison circuit Com1 may generate a first comparison result by comparing the first present latch data CLD1 and the first-first previous latch data PLD1-1*a*, and may generate a third comparison result by comparing the first present latch data CLD1 and the first-third previous latch data PLD1-1*c*. The first comparison circuit Com1 generates a final comparison result by combining the first and third comparison results, and outputs the first-first bias current control signal BC11 depending on the final comparison result.

In the second comparison period CP2*a*, because the three upper bits of the first present latch data CLD1 are "001", and the three upper bits of the first-first previous latch data PLD1-1*a* are "010", a difference between "001" and "010" corresponds to 1 bit. Accordingly, the first comparison result has a state of logic "1". Moreover, in the second comparison period CP2*a*, because the three upper bits of the first present latch data CLD1 are "001", and the three upper bits of the first-third previous latch data PLD1-1*c* are "000", a difference between "001" and "000" corresponds to 1 bit. Accordingly, the third comparison result has a state of logic "1". When both the first and third comparison results are logic "1", the first comparison circuit Com1 may generate logic "1" as the final comparison result. Accordingly, the first-first bias current control signal BC11 may remain in an active state. An activation period of the first-first bias current control signal BC11 may be defined as a low-power period LCPc in which the first output buffer AMP1 operates with a low bias current.

Next, during the first comparison period CP1*a*, because the three upper bits of the first present latch data CLD1 are "011", and the three upper bits of the first-first previous latch data PLD1-1*a* are "001", a difference between "011" and "001" exceeds 1 bit. Accordingly, the comparison result has a state of logic "0". Accordingly, the state of the first-first bias current control signal BC11 may be switched to an inactive state.

The low-power period LCPc shown in FIGS. 8A and 8B may have duration longer than the low-power period LCPb shown in FIGS. 7A and 7B. Accordingly, when being connected to the selection circuit 250 operating in the second method, the data driving circuit 200 may more efficiently reduce the power consumption of each of the output buffers AMP1 to AMPk when applying a different comparison method for each comparison period.

Figure 9:
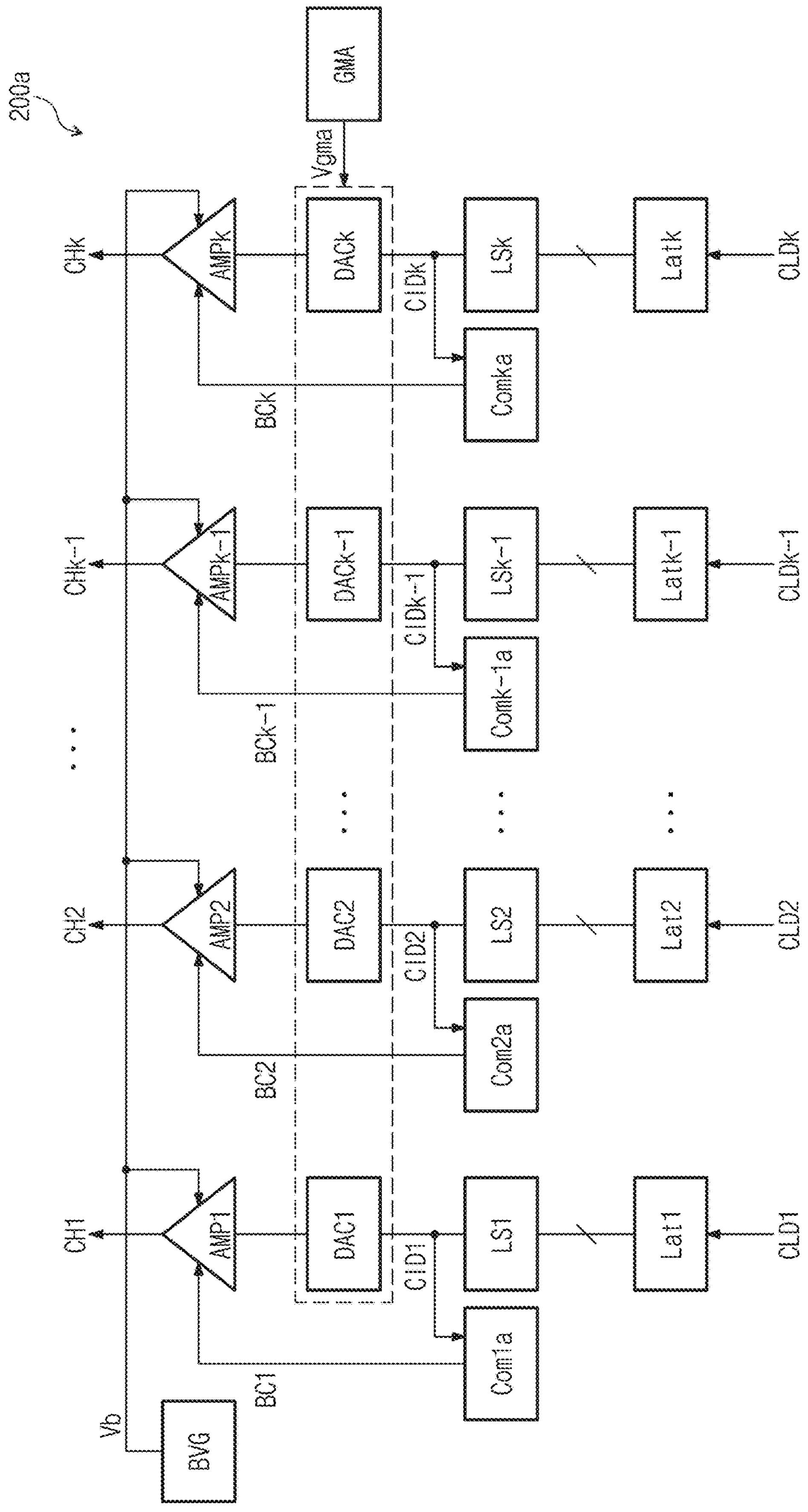
FIG. 9 is an internal block diagram of a data driving circuit according to an embodiment of the present disclosure.

FIG. 9 is an internal block diagram of a data driving circuit according to an embodiment of the present disclosure.

Referring to FIG. 9, the data driving circuit 200*a* includes the plurality of latches Lat1, Lat2 to Latk-1, and Latk, the plurality of level shifting circuits LS1, LS2 to LSk-1, and LSk, a plurality of comparison circuits Com1*a*, Com2*a* to Comk-1a, and Comka, the plurality of digital-to-analog conversion circuits DAC1, DAC2 to DACk-1, and DACK, and the plurality of output buffers AMP1, AMP2 to AMPk-1, and AMPk.

The plurality of latches Lat1, Lat2 to Latk-1, and Latk store pieces of latch data, respectively. For example, among the plurality of latches Lat1, Lat2 to Latk-1, and Latk, the first latch Lat1 stores the first latch data CLD1 among pieces of latch data, and the second latch Lat2 stores the second latch data CLD2. The (k-1)-th latch Latk-1 stores (k-1)-th latch data CLDk-1. The k-th latch Latk stores k-th latch data CLDk. As an example of the present disclosure, each first to k-th latch data CLD1 to CLDk may be p bits digital data. Here, ‘p’ may be an integer of 1 or more.

The plurality of level shifting circuits LS1, LS2 to LSk-1, and LSk may receive the pieces of latch data, may shift levels of the pieces of latch data, and may output pieces of image data, respectively. The first level shifting circuit LS1 shifts the level of the first latch data CLD1 and outputs first image data CID1. The second level shifting circuit LS2 shifts the level of the second latch data CLD2 and outputs second image data CID2. The (k-1)-th level shifting circuit LSk-1 shifts the level of the (k-1)-th latch data CLDk-1 and outputs the (k-1)-th image data CIDk-1. The k-th level shifting circuit LSk shifts the level of the k-th latch data CLDk and outputs the k-th image data CIDk.

The plurality of comparison circuits Com1*a*, Com2*a* to Comk-1a, and Comka are positioned to one-to-one correspond to the plurality of level shifting circuits LS1, LS2 to LSk-1, and LSk, respectively. Each of the plurality of comparison circuits Com1*a*, Com2*a* to Comk-1a, and Comka may receive image data from the corresponding level shifting circuit. For example, among the plurality of comparison circuits Com1*a*, Com2*a* to Comk-1a, and Comka, the first comparison circuit Com1*a* receives the first image data CID1 (or, referred to as first present image data) from the first level shifting circuit LS1, and the second comparison circuit Com2*a* receives the second image data CID2 (or, referred to as second present image data) from the second level shifting circuit LS2. The (k-1)-th comparison circuit Comk-1a receives the (k-1)-th image data CIDk-1 (or, referred to as (k-1)-th present image data) from the (k-1)-th level shifting circuit LSk-1, and the k-th comparison circuit Comka receives the k-th image data CIDk (or, referred to as k-th present image data) from the k-th level shifting circuit LSk.

Each of the plurality of comparison circuits Com1*a*, Com2*a* to Comk-1a, and Comka compares present image data with pre-stored previous image data and outputs a first bias current control signal depending on the comparison result. Each of the plurality of comparison circuits Com1*a*, Com2*a* to Comk-1a, and Comka compares q upper bits of the present image data with q upper bits of the previous image data, and outputs a bias current control signal depending on the comparison result. Here, ‘q’ is an integer greater than or equal to 1, and ‘q’ may be a number smaller than ‘p’. For example, when ‘p’ is 8, ‘q’ may be 2 or 3.

The first comparison circuit Com1*a* compares the first present image data CID1 with pre-stored first image data, and outputs a bias current control signal BC1 depending on the comparison result. The first previous image data PLD1 (see FIG. 5) may be the first image data received from the first level shifting circuit LS1 during the previous horizontal scanning period. The second comparison circuit Com2*a* compares the second present image data CID2 with pre-stored second image data, and outputs a bias current control signal BC2 depending on the comparison result. The second previous image data may be second image data received from the second level shifting circuit LS2 during the previous horizontal scanning period. The (k-1)-th comparison circuit Comk-1a compares (k-1)-th present image data CIDk-1 with pre-stored (k-1)-th previous image data, and outputs a bias current control signal BCk-1 depending on the comparison result. During the previous horizontal scanning period, the (k-1)-th previous image data may be (k-1)-th image data received from the (k-1)-th level shifting circuit LSk-1. The k-th comparison circuit Comka compares the k-th present image data CIDk with the pre-stored k-th previous image data, and outputs a bias current control signal BCk depending on the comparison result. The k-th previous image data may be k-th image data received from the k-th level shifting circuit LSK during the previous horizontal scanning period.

The plurality of output buffers AMP1, AMP2 to AMPk-1, and AMPk may receive a plurality of bias current control signal from the plurality of comparison circuits Com1*a*, Com2*a* to Comk-1a, and Comka, respectively. Each of the plurality of output buffers AMP1, AMP2 to AMPk-1, and AMPk may control the bias current consumed in the corresponding output buffer by controlling the bias voltage Vb in response to the corresponding bias current control signal. In detail, the first output buffer AMP1 may control the bias voltage Vb in response to the bias current control signal BC1, thereby controlling the bias current consumed in the first output buffer AMP1. The second output buffer AMP2 may control the bias voltage Vb in response to the bias current control signal BC2, thereby controlling the bias current consumed in the second output buffer AMP2. The (k-1)-th output buffer AMPk-1 may control the bias voltage Vb in response to the bias current control signal BCk-1, thereby controlling the bias current consumed in the (k-1)-th output buffer AMPk-1. The k-th output buffer AMPk may control the bias voltage Vb in response to the bias current control signal BCk, thereby controlling the bias current consumed in the k-th output buffer AMPk.

The plurality of output buffers AMP1, AMP2 to AMPk-1, and AMPk may output data signals through channels CH1, CH2 to CHk-1, and CHk in response to an output enable signal. The output enable signal may be a signal included in the data control signal DCS (see FIG. 3) provided from the driving controller 100 (see FIG. 3) to the data driving circuit 200*a*.

As such, when the plurality of comparison circuits Com1*a*, Com2*a* to Comk-1a, and Comka are respectively positioned to correspond to the plurality of level shifting circuits LS1, LS2 to LSk-1, and LSk, the sub-level shifting circuits SLS1, SLS2 to SLSk-1, and SLSk shown in FIG. 5 may be omitted from the data driving circuit 200*a*. Accordingly, the data driving circuit 200*a* shown in FIG. 9 may have a more simplified circuit configuration than the data driving circuit 200 shown in FIG. 5. As a result, the overall size of the data driving circuit 200*a* may be reduced.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, latch data corresponding to each channel in a data driving circuit may be compared with previous latch data. A bias current of an output buffer connected to each channel may be controlled depending on the comparison results. In other words, the power consumption of each of a plurality of output buffers provided in the data driving circuit may be individually controlled, thereby efficiently reducing the overall power consumption of the data driving circuit.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a data driving circuit including a plurality of driver chips each including a plurality of channels configured to output a plurality of data signals, respectively; and a display panel including data lines configured to receive the data signals output from the data driving circuit, wherein each of the driver chips includes:

a plurality of latches configured to store pieces of latch data, respectively;

a plurality of comparison circuits configured to be positioned to correspond to the plurality of latches, each of the comparison circuits compares present latch data with pre-stored previous latch data, and each of the comparison circuits outputs a first bias current control signal depending on the comparison result;

a plurality of level shifting circuits configured to receive the pieces of latch data from the plurality of latches, respectively, and configured to output pieces of image data by shifting levels of the pieces of latch data, respectively;

a plurality of sub-level shifting circuits, each of which receives the first bias current control signal from the plurality of comparison circuits, and each of which outputs a second bias current control signal by shifting a level of the first bias current control signal;

a plurality of digital-to-analog conversion circuits configured to convert the pieces of image data into the data signals having an analog format, respectively; and a plurality of output buffers configured to output the data signals to the plurality of channels, respectively, wherein the second bias current control signal reduces a bias current of a corresponding output buffer among the plurality of output buffers, wherein each of the plurality of comparison circuits is configured to:

generate a first comparison result by comparing the present latch data with first previous latch data among the previous latch data;

generate a second comparison result by comparing the present latch data with second previous latch data among the previous latch data;

when both the first comparison result and the second comparison result are less than or equal to a predetermined reference value, activate the first bias current control signal; and when at least one of the first comparison result and the second comparison result exceeds the reference value, deactivate the first bias current control signal.

2. The display device of claim 1, further comprising:

a selection circuit disposed between the data lines and the data driving circuit, and configured to selectively connect the data driving circuit to a part of the data lines, wherein the selection circuit includes:

a first switching circuit activated during a first selection period; and a second switching circuit activated during a second selection period, and wherein the first selection period and the second selection period occur alternately.

3. The display device of claim 1, wherein, when the present latch data is N-th latch data, the first previous latch data is (N-1)-th latch data, and the second previous latch data is (N-2)-th latch data.

4. The display device of claim 1, wherein each of the present latch data, the first previous latch data, and the second previous latch data is p bits data, wherein each of the plurality of comparison circuits is configured to:

compare q upper bits of the present latch data with q upper bits of each of the first previous latch data, and the second previous latch data, and wherein each of the p and the q is a natural number greater than or equal to 1, and the q is less than the p.

5. The display device of claim 4, wherein the q is 2, wherein the first comparison result indicates a difference between two upper bits of the present latch data and two upper bits of the first previous latch data, wherein the second comparison result indicates a difference between the two upper bits of the present latch data and two upper bits of the second previous latch data, and wherein the reference value is 1 bit.

6. The display device of claim 4, wherein the q is 3, wherein the first comparison result indicates a difference between three upper bits of the present latch data and three upper bits of the first previous latch data, wherein the second comparison result indicates a difference between the three upper bits of the present latch data and three upper bits of the second previous latch data, and wherein the reference value is 1 bit.

7. The display device of claim 1, wherein each of the plurality of comparison circuits is configured to:

receive the previous latch data from a corresponding latch among the plurality of latches.

8. The display device of claim 1, wherein the data driving circuit further includes:

a bias voltage generator configured to supply a bias voltage to the output buffers, and wherein the second bias current control signal is provided to the corresponding output buffer to reduce the bias current.

9. A display device comprising:

a data driving circuit including a plurality of driver chips each including a plurality of channels configured to output a plurality of data signals, respectively; and a display panel including data lines configured to receive the data signals output from the data driving circuit, wherein each of the driver chips includes:

a plurality of latches configured to store pieces of latch data, respectively;

a plurality of comparison circuits configured to be positioned to correspond to the plurality of latches, each of the comparison circuits compares present latch data with pre-stored previous latch data, and each of the comparison circuits outputs a first bias current control signal depending on the comparison result;

a plurality of level shifting circuits configured to receive the pieces of latch data from the plurality of latches, respectively, and configured to output pieces of image data by shifting levels of the pieces of latch data, respectively;

a plurality of sub-level shifting circuits, each of which receives the first bias current control signal from the plurality of comparison circuits, and each of which outputs a second bias current control signal by shifting a level of the first bias current control signal;

a plurality of digital-to-analog conversion circuits configured to convert the pieces of image data into the data signals having an analog format, respectively; and a plurality of output buffers configured to output the data signals to the plurality of channels, respectively, wherein the second bias current control signal reduces a bias current of a corresponding output buffer among the plurality of output buffers, wherein each of the plurality of comparison circuits is configured to:

generate a comparison result by comparing the present latch data with the previous latch data;

when the comparison result is less than or equal to a predetermined reference value, activate the first bias current control signal; and when the comparison result exceeds the reference value, deactivate the first bias current control signal.

10. The display device of claim 9, further comprises:

a selection circuit disposed between data lines and the data driving circuit, and configured to selectively connect the data driving circuit to a part of the data lines, wherein the selection circuit includes:

a first switching circuit activated during a first selection period; and a second switching circuit activated during a second selection period, and wherein two first selection periods and two second selection periods alternately occur.

11. The display device of claim 9, wherein, when the present latch data is N-th latch data, the previous latch data is (N-1)-th latch data.

12. The display device of claim 11, wherein each of the present latch data and the previous latch data is p bits data, wherein each of the plurality of comparison circuits is configured to:

compare q upper bits of the present latch data with q upper bits of the previous latch data, and wherein each of the p and the q is a natural number greater than or equal to 1, and the q is less than the p.

13. The display device of claim 12, wherein the q is 2, wherein the comparison result indicates a difference between two upper bits of the present latch data and two upper bits of the previous latch data, and wherein the reference value is 1 bit.

14. The display device of claim 12, wherein the q is 3, wherein the comparison result indicates a difference between three upper bits of the present latch data and three upper bits of the previous latch data, and wherein the reference value is 1 bit.

15. The display device of claim 9, wherein each of the plurality of comparison circuits is configured to:

generate a first comparison result by comparing the present latch data with first previous latch data among the previous latch data;

generate a third comparison result by comparing the present latch data with third previous latch data among the previous latch data;

when both the first comparison result and the third comparison result are less than or equal to a predetermined reference value, activate the first bias current control signal; and when at least one of the first comparison result and the third comparison result exceeds the reference value, deactivate the first bias current control signal.

16. The display device of claim 15, wherein, when the present latch data is N-th latch data, the first previous latch data is (N-1)-th latch data, and the third previous latch data is (N-3)-th latch data.

17. The display device of claim 16, wherein each of the present latch data, the first previous latch data, and the third previous latch data is p bits data, wherein each of the plurality of comparison circuits is configured to:

compare q upper bits of the present latch data with q upper bits of the first previous latch data; and compare the q upper bits of the present latch data with q upper bits of the third previous latch data, and wherein each of the p and the q is a natural number greater than or equal to 1, and the q is less than the p.

18. The display device of claim 17, wherein the q is 2, wherein the first comparison result indicates a difference between two upper bits of the present latch data and two upper bits of the first previous latch data, wherein the third comparison result indicates a difference between the three upper bits of the present latch data and three upper bits of the third previous latch data, and wherein the reference value is 1 bit.

19. The display device of claim 17, wherein the q is 3, wherein the first comparison result indicates a difference between three upper bits of the present latch data and three upper bits of the first previous latch data, wherein the third comparison result indicates a difference between the two upper bits of the present latch data and third upper bits of the third previous latch data, and wherein the reference value is 1 bit.

20. An electronic device comprising:

a data driving circuit including a plurality of driver chips each including a plurality of channels configured to output a plurality of data signals to the plurality of channels, respectively; and a display panel configured to receive the data signals output from the data driving circuit, wherein each of the driver chips includes:

a plurality of latches configured to store pieces of latch data, respectively;

a plurality of level shifting circuits configured to receive the pieces of latch data from the plurality of latches, respectively, and configured to output pieces of image data by shifting levels of the pieces of latch data, respectively;

a plurality of comparison circuits configured to be disposed to correspond to the plurality of level shifting circuits, respectively, each of the comparison circuits compares present image data with pre-stored previous image data, and each of the comparison circuits outputs a bias current control signal depending on the comparison result;

a digital-to-analog conversion circuit configured to convert the pieces of image data into the data signals having an analog format, respectively; and a plurality of output buffers configured to output the data signals to the plurality of channels respectively, wherein the bias current control signal reduces a bias current of a corresponding output buffer among the plurality of output buffers, wherein each of the plurality of comparison circuits is configured to:

generate a first comparison result by comparing the present latch data with first previous latch data among the previous latch data;

generate a second comparison result by comparing the present latch data with second previous latch data among the previous latch data;

when both the first comparison result and the second comparison result are less than or equal to a predetermined reference value, activate the first bias current control signal; and when at least one of the first comparison result and the second comparison result exceeds the reference value, deactivate the first bias current control signal.

21. The electronic device of claim 20, wherein each of the plurality of comparison circuits is configured to:

receive the present image data from a corresponding level shifting circuit among the plurality of level shifting circuits; and compare the present image data and the previous image data.

22. The electronic device of claim 20, wherein the data driving circuit further includes:

a bias voltage generator configured to supply a bias voltage to the output buffers, and wherein the bias current control signal reduces the bias current of the corresponding output buffer.

* * * * *